US008070587B2

(12) United States Patent
Davis et al.

(10) Patent No.: US 8,070,587 B2
(45) Date of Patent: Dec. 6, 2011

(54) GAMING SYSTEM AND METHOD PROVIDING A MULTIPLAYER BONUS GAME HAVING A PLURALITY OF AWARD OPPORTUNITIES

(75) Inventors: Dwayne A. Davis, Reno, NV (US); Paul D. Miltenberger, San Francisco, CA (US); Mark C. Nicely, Daly City, CA (US)

(73) Assignee: IGT, Reno, NV (US)

( * ) Notice: Subject to any disclaimer, the term of this patent is extended or adjusted under 35 U.S.C. 154(b) by 1063 days.

(21) Appl. No.: 11/925,296

(22) Filed: Oct. 26, 2007

(65) Prior Publication Data

US 2009/0111560 A1 Apr. 30, 2009

(51) Int. Cl.
*A63F 13/00* (2006.01)

(52) U.S. Cl. ........................................... 463/20; 463/18

(58) Field of Classification Search .................... 463/18, 463/20
See application file for complete search history.

(56) References Cited

U.S. PATENT DOCUMENTS

| | | | |
|---|---|---|---|
| 3,533,629 | A | 10/1970 | Raven et al. |
| 4,033,588 | A | 7/1977 | Watts |
| 4,157,829 | A | 6/1979 | Goldman et al. |
| 4,335,809 | A | 6/1982 | Wain |
| 4,339,798 | A | 7/1982 | Hedges et al. |
| 4,467,424 | A | 8/1984 | Hedges et al. |
| 4,494,197 | A | 1/1985 | Troy et al. |
| 4,582,324 | A | 4/1986 | Koza et al. |
| 4,652,998 | A | 3/1987 | Koza et al. |
| 4,669,730 | A | 6/1987 | Small |
| 4,689,742 | A | 8/1987 | Troy et al. |
| 4,695,053 | A | 9/1987 | Vazquez et al. |
| 4,756,531 | A | 7/1988 | DiRe et al. |
| 4,775,155 | A | 10/1988 | Lees |
| 4,805,907 | A | 2/1989 | Hagiwara |
| 4,815,741 | A | 3/1989 | Small |
| 4,817,951 | A | 4/1989 | Crouch et al. |
| 4,836,546 | A | 6/1989 | DiRe |
| 4,836,548 | A | 6/1989 | Chittenden |

(Continued)

FOREIGN PATENT DOCUMENTS

| | | |
|---|---|---|
| AU | 711501 | 10/1999 |

(Continued)

OTHER PUBLICATIONS

Alley Cat Keno Game Description, written by IGT, available prior to Sep. 12, 2002.

(Continued)

*Primary Examiner* — Peter DungBa Vo
*Assistant Examiner* — Allen Chan
(74) *Attorney, Agent, or Firm* — K&L Gates LLP

(57) ABSTRACT

A gaming system where, as players play the primary games of the gaming devices, the gaming devices or the players playing at those gaming devices are occasionally provided with game elements associated with a multiplayer bonus game. In one embodiment, when a designated number of the game elements associated with the multiplayer bonus game have been awarded during game play, the multiplayer bonus game is triggered. During the multiplayer bonus game, the gaming system randomly selects a plurality of the game elements and compares the randomly selected game elements with the game elements awarded to the players. The players receive bonus awards based at least in part on the relationship between the awarded game elements and the game elements which are randomly selected during the bonus game.

13 Claims, 15 Drawing Sheets

U.S. PATENT DOCUMENTS

| | | | |
|---|---|---|---|
| 4,842,278 | A | 6/1989 | Markowicz |
| 4,856,787 | A | 8/1989 | Itkis |
| 4,982,337 | A | 1/1991 | Burr et al. |
| 4,991,848 | A | 2/1991 | Greenwood et al. |
| 5,042,809 | A | 8/1991 | Richardson |
| 5,046,737 | A | 9/1991 | Fienberg |
| 5,092,598 | A | 3/1992 | Kamille |
| 5,100,139 | A | 3/1992 | Di Bella |
| 5,116,049 | A | 5/1992 | Sludikoff et al. |
| 5,116,055 | A | 5/1992 | Tracy |
| 5,158,293 | A | 10/1992 | Mullins |
| 5,242,163 | A | 9/1993 | Fulton |
| 5,265,874 | A | 11/1993 | Dickinson et al. |
| 5,275,400 | A | 1/1994 | Weingardt et al. |
| 5,276,312 | A | 1/1994 | McCarthy |
| 5,280,909 | A | 1/1994 | Tracy |
| 5,282,620 | A | 2/1994 | Keesee |
| 5,324,035 | A | 6/1994 | Morris et al. |
| 5,342,047 | A | 8/1994 | Heidel et al. |
| 5,344,144 | A | 9/1994 | Canon |
| 5,393,057 | A | 2/1995 | Marnell, II |
| 5,398,932 | A | 3/1995 | Eberhardt et al. |
| 5,401,024 | A | 3/1995 | Simunek |
| 5,407,199 | A | 4/1995 | Gumina |
| 5,476,259 | A | 12/1995 | Weingardt |
| 5,482,289 | A | 1/1996 | Weingardt |
| 5,536,016 | A | 7/1996 | Thompson |
| 5,586,937 | A | 12/1996 | Menashe |
| 5,611,730 | A | 3/1997 | Weiss |
| 5,628,684 | A | 5/1997 | Bouedec |
| 5,639,089 | A | 6/1997 | Matsumoto et al. |
| 5,645,486 | A | 7/1997 | Nagao et al. |
| 5,647,798 | A | 7/1997 | Falciglia |
| 5,657,993 | A | 8/1997 | Merlino et al. |
| 5,664,998 | A | 9/1997 | Seelig et al. |
| 5,674,128 | A | 10/1997 | Holch et al. |
| 5,718,631 | A | 2/1998 | Invencion |
| 5,720,483 | A | 2/1998 | Trinh |
| 5,727,786 | A | 3/1998 | Weingardt |
| 5,755,619 | A | 5/1998 | Matsumoto et al. |
| 5,779,545 | A | 7/1998 | Berg et al. |
| 5,788,573 | A | 8/1998 | Baerlocher et al. |
| 5,800,269 | A | 9/1998 | Holch et al. |
| 5,833,537 | A | 11/1998 | Barrie |
| 5,851,148 | A | 12/1998 | Brune et al. |
| 5,855,515 | A | 1/1999 | Pease et al. |
| 5,871,398 | A | 2/1999 | Schneier et al. |
| 5,882,261 | A | 3/1999 | Adams |
| 5,902,184 | A | 5/1999 | Bennett et al. |
| 5,909,875 | A | 6/1999 | Weingardt |
| 5,935,002 | A | 8/1999 | Falciglia |
| 5,944,606 | A | 8/1999 | Gerow |
| 5,947,820 | A | 9/1999 | Morro et al. |
| 5,949,042 | A | 9/1999 | Dietz, II et al. |
| 5,954,582 | A | 9/1999 | Zach |
| 5,970,143 | A | 10/1999 | Schneier et al. |
| 5,971,849 | A | 10/1999 | Falciglia |
| 5,980,384 | A | 11/1999 | Barrie |
| 5,997,400 | A | 12/1999 | Seelig et al. |
| 5,997,401 | A | 12/1999 | Crawford |
| 6,004,207 | A | 12/1999 | Wilson, Jr. et al. |
| 6,012,982 | A | 1/2000 | Piechowiak et al. |
| 6,015,346 | A | 1/2000 | Bennett |
| 6,017,032 | A | 1/2000 | Grippo et al. |
| 6,024,640 | A | 2/2000 | Walker et al. |
| 6,033,306 | A | 3/2000 | DeSouza |
| 6,056,642 | A | 5/2000 | Bennett |
| 6,059,289 | A | 5/2000 | Vancura |
| 6,062,981 | A | 5/2000 | Luciano, Jr. |
| 6,079,711 | A | 6/2000 | Wei et al. |
| 6,089,976 | A | 7/2000 | Schneider et al. |
| 6,089,978 | A | 7/2000 | Adams |
| 6,089,982 | A | 7/2000 | Holch et al. |
| 6,099,408 | A | 8/2000 | Schneier et al. |
| 6,102,400 | A | 8/2000 | Scott et al. |
| 6,110,043 | A | 8/2000 | Olsen |
| 6,117,009 | A | 9/2000 | Yoseloff |
| 6,129,632 | A | 10/2000 | Luciano |
| 6,146,272 | A | 11/2000 | Walker et al. |
| 6,146,273 | A | 11/2000 | Olsen |
| 6,155,925 | A | 12/2000 | Giobbi et al. |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,521 | B1 | 1/2001 | Luciano et al. |
| 6,183,361 | B1 | 2/2001 | Cummings et al. |
| 6,203,010 | B1 | 3/2001 | Jorasch et al. |
| 6,203,428 | B1 | 3/2001 | Giobbi et al. |
| 6,210,275 | B1 | 4/2001 | Olsen |
| 6,210,276 | B1 | 4/2001 | Mullins |
| 6,210,279 | B1 | 4/2001 | Dickinson |
| 6,217,448 | B1 | 4/2001 | Olsen |
| 6,220,961 | B1 | 4/2001 | Keane et al. |
| 6,224,482 | B1 | 5/2001 | Bennett |
| 6,224,484 | B1 | 5/2001 | Okuda et al. |
| 6,234,897 | B1 | 5/2001 | Frohm et al. |
| 6,241,606 | B1 | 6/2001 | Riendeau et al. |
| 6,250,685 | B1 | 6/2001 | Walker et al. |
| 6,254,480 | B1 | 7/2001 | Zach |
| 6,273,820 | B1 | 8/2001 | Haste, III |
| 6,280,328 | B1 | 8/2001 | Holch et al. |
| 6,283,855 | B1 | 9/2001 | Bingham |
| 6,309,298 | B1 | 10/2001 | Gerow |
| 6,311,976 | B1 | 11/2001 | Yoseloff et al. |
| 6,312,334 | B1 | 11/2001 | Yoseloff |
| 6,315,291 | B1 | 11/2001 | Moody |
| 6,325,716 | B1 | 12/2001 | Walker et al. |
| 6,334,814 | B1 | 1/2002 | Adams |
| 6,336,862 | B1 | 1/2002 | Byrne |
| 6,346,043 | B1 | 2/2002 | Colin et al. |
| 6,358,151 | B1 | 3/2002 | Enzminger et al. |
| 6,364,313 | B1 | 4/2002 | Moody |
| 6,368,214 | B1 | 4/2002 | Luciano |
| 6,368,218 | B2 | 4/2002 | Angell, Jr. |
| 6,386,977 | B1 | 5/2002 | Hole |
| 6,398,218 | B1 | 6/2002 | Vancura |
| 6,398,644 | B1 | 6/2002 | Perrie et al. |
| 6,398,645 | B1 | 6/2002 | Yoseloff |
| 6,402,614 | B1 | 6/2002 | Schneier et al. |
| 6,419,583 | B1 | 7/2002 | Crumby et al. |
| 6,425,823 | B1 | 7/2002 | Byrne |
| 6,428,412 | B1 | 8/2002 | Anderson et al. |
| 6,443,837 | B1 | 9/2002 | Jaffe et al. |
| 6,450,885 | B2 | 9/2002 | Schneier et al. |
| 6,454,648 | B1 | 9/2002 | Kelly et al. |
| 6,454,651 | B1 | 9/2002 | Yoseloff |
| RE37,885 | E | 10/2002 | Acres et al. |
| 6,461,241 | B1 | 10/2002 | Webb et al. |
| 6,464,582 | B1 | 10/2002 | Baerlocher et al. |
| 6,471,591 | B1 | 10/2002 | Crumby |
| 6,475,086 | B2 | 11/2002 | Zach |
| 6,478,677 | B1 | 11/2002 | Moody |
| 6,481,713 | B2 | 11/2002 | Perrie et al. |
| 6,508,711 | B1 | 1/2003 | Ono |
| 6,514,144 | B2 | 2/2003 | Riendeau et al. |
| 6,524,184 | B1 | 2/2003 | Lind et al. |
| 6,527,638 | B1 | 3/2003 | Walker et al. |
| 6,533,660 | B2 | 3/2003 | Seelig et al. |
| 6,533,664 | B1 | 3/2003 | Crumby |
| 6,537,150 | B1 | 3/2003 | Luciano et al. |
| 6,599,193 | B2 | 7/2003 | Baerlocher et al. |
| 6,609,973 | B1 | 8/2003 | Weiss |
| 6,645,071 | B2 | 11/2003 | Perrie et al. |
| 6,656,044 | B1 | 12/2003 | Lewis |
| 6,682,419 | B2 | 1/2004 | Webb et al. |
| 6,682,420 | B2 | 1/2004 | Webb et al. |
| 6,702,699 | B2 | 3/2004 | Touhey et al. |
| 6,729,961 | B1 | 5/2004 | Millerschone |
| 6,733,389 | B2 | 5/2004 | Webb et al. |
| 6,739,970 | B2 | 5/2004 | Luciano |
| 6,749,500 | B1 | 6/2004 | Nelson et al. |
| 6,764,397 | B1 | 7/2004 | Robb |
| 6,824,465 | B2 | 11/2004 | Luciano, Jr. |
| 6,855,055 | B2 | 2/2005 | Perrie et al. |
| 6,981,917 | B2 | 1/2006 | Webb et al. |
| 7,169,046 | B2 | 1/2007 | Webb et al. |
| 7,291,068 | B2 | 11/2007 | Bryant et al. |

| | | | | |
|---|---|---|---|---|
| 7,306,519 | B2 | 12/2007 | Baerlocher | |
| 7,311,598 | B2 | 12/2007 | Kaminkow et al. | |
| 7,311,604 | B2 | 12/2007 | Kaminkow et al. | |
| 7,318,774 | B2 | 1/2008 | Bryant et al. | |
| 7,357,714 | B2 | 4/2008 | Tessmer et al. | |
| 7,914,372 | B2 | 3/2011 | Tessmer et al. | |
| 2002/0010013 | A1 | 1/2002 | Walker et al. | |
| 2002/0010018 | A1* | 1/2002 | Lemay et al. | 463/20 |
| 2002/0058545 | A1 | 5/2002 | Luciano | |
| 2002/0072404 | A1 | 6/2002 | Gerow | |
| 2002/0082070 | A1 | 6/2002 | Macke et al. | |
| 2002/0098882 | A1 | 7/2002 | Lind et al. | |
| 2002/0098883 | A1 | 7/2002 | Packes, Jr. et al. | |
| 2002/0111214 | A1 | 8/2002 | Lind et al. | |
| 2002/0113369 | A1 | 8/2002 | Weingardt | |
| 2002/0160828 | A1 | 10/2002 | Webb et al. | |
| 2002/0160829 | A1 | 10/2002 | Webb et al. | |
| 2002/0169018 | A1 | 11/2002 | Schneier et al. | |
| 2002/0198042 | A1 | 12/2002 | Webb et al. | |
| 2003/0073480 | A1* | 4/2003 | Thomas et al. | 463/18 |
| 2003/0181231 | A1 | 9/2003 | Vancura et al. | |
| 2003/0181234 | A1 | 9/2003 | Falciglia, Sr. | |
| 2003/0181238 | A1* | 9/2003 | DeMar et al. | 463/20 |
| 2003/0186733 | A1 | 10/2003 | Wolf et al. | |
| 2003/0193136 | A1 | 10/2003 | Walker et al. | |
| 2003/0211884 | A1 | 11/2003 | Gauselmann | |
| 2003/0236116 | A1 | 12/2003 | Marks et al. | |
| 2004/0048644 | A1 | 3/2004 | Gerrard et al. | |
| 2004/0106445 | A1 | 6/2004 | Perrie et al. | |
| 2004/0171415 | A1 | 9/2004 | Webb et al. | |
| 2004/0209663 | A1 | 10/2004 | Webb et al. | |
| 2004/0259629 | A1 | 12/2004 | Michaelson et al. | |
| 2005/0014553 | A1 | 1/2005 | Byrne | |
| 2005/0037832 | A1 | 2/2005 | Cannon | |
| 2005/0070353 | A1 | 3/2005 | Webb et al. | |
| 2005/0090305 | A1* | 4/2005 | Silva et al. | 463/16 |
| 2005/0119047 | A1 | 6/2005 | Olive | |
| 2005/0143168 | A1 | 6/2005 | Torango | |
| 2005/0176488 | A1 | 8/2005 | Olive | |
| 2005/0202863 | A1 | 9/2005 | Macaulay | |
| 2005/0209004 | A1 | 9/2005 | Torango | |
| 2005/0227753 | A1 | 10/2005 | Luciano, Jr. | |
| 2005/0239542 | A1 | 10/2005 | Olsen | |
| 2006/0040723 | A1 | 2/2006 | Baerlocher et al. | |
| 2006/0040732 | A1 | 2/2006 | Baerlocher et al. | |
| 2006/0040733 | A1 | 2/2006 | Baerlocher et al. | |
| 2006/0040734 | A1 | 2/2006 | Baerlocher et al. | |
| 2006/0040736 | A1 | 2/2006 | Baerlocher et al. | |
| 2006/0046822 | A1 | 3/2006 | Kaminkow et al. | |
| 2006/0058095 | A1 | 3/2006 | Berman et al. | |
| 2006/0068880 | A1 | 3/2006 | Cannon | |
| 2006/0073870 | A1* | 4/2006 | Cannon | 463/17 |
| 2006/0094496 | A1 | 5/2006 | Webb et al. | |
| 2006/0111170 | A1* | 5/2006 | Hornik et al. | 463/16 |
| 2006/0142077 | A1 | 6/2006 | Miles et al. | |
| 2006/0178196 | A1 | 8/2006 | Thomas | |
| 2007/0054732 | A1 | 3/2007 | Baerlocher | |
| 2007/0054733 | A1 | 3/2007 | Baerlocher | |
| 2007/0077980 | A1 | 4/2007 | Marks et al. | |
| 2007/0077990 | A1 | 4/2007 | Cuddy et al. | |
| 2007/0093287 | A1 | 4/2007 | Brunelle et al. | |
| 2007/0149292 | A1 | 6/2007 | Kaminkow et al. | |
| 2007/0155485 | A1 | 7/2007 | Cuddy et al. | |
| 2007/0167217 | A1 | 7/2007 | Kaminkow et al. | |
| 2007/0184887 | A1 | 8/2007 | Cannon | |

FOREIGN PATENT DOCUMENTS

| | | |
|---|---|---|
| AU | 771847 | 4/2004 |
| GB | 2 137 392 | 10/1984 |
| GB | 2 374 294 | 10/2002 |
| WO | WO 98/35309 | 8/1998 |
| WO | WO 00/12186 | 3/2000 |
| WO | WO 00/67424 | 11/2000 |
| WO | WO 02/097749 | 12/2002 |
| WO | WO 2004/014502 | 2/2004 |
| WO | WO 2005/083599 | 9/2005 |
| WO | WO 2005/099425 | 10/2005 |
| WO | 2007090270 | 8/2007 |

OTHER PUBLICATIONS

Believe it or Not Article written by Strictly Slots, published in 2001.
Big Top Keno Advertisement, written by Aristocrat, published Oct. 2000.
Bing Ball Bingo Advertisement, written by BCSI Corporation, published prior to 2003.
Bingo Advertisement and Jackpot Bingo Advertisement written by Casino Data Systems, published in 1998 and 2001.
Bingo Advertisement, written by Casino Data Systems, published 1998.
Bingo Advertisement, written by WMS Gaming, Inc., published prior to 2003.
Bingo Brasil Advertisement, written by Unidesa Gaming, published prior to 2003.
Bingo Game Station Advertisement, written by Cole Gaming Technologies, published prior to 2003.
Bingo Party Advertisement, written by Amatic Industries, published in 2001.
Bingo Slot Advertisement, written by Unidesa Gaming, published prior to 2003.
Bingo Wizard Advertisement, written by Applied Concepts, published 2002.
Bonus Bingo Advertisement, written by Unidesa Gaming, published prior to 2003.
Bonus Spin Diamond Fives Advertisement written by IGT, published in 1999.
Bonus Spin Red, White & Blue Advertisement written by IGT, published prior to 2000.
Boom Advertisements written by WMS Gaming, Inc., published in 1998.
California Dreams Advertisement, written by Cadillac Jack, published in 2000.
Canadian Bingo Advertisement, written by Unidesa Gaming, published prior to 2003.
Cash Box Advertisement, written by Anchor Games/IGT, published in Strictly Slots in Jul. 2000.
Cash Express Advertisements, written by Aristocrat, published in 2002.
Cash Keno Advertisement, written by IGT, available prior to 2003.
Cleopatra Bingo Advertisement, written by IGT, published in 2000 and 2004.
Clue Advertisement written by Mikohn, available in 2002.
Diamonopoly Advertisement, written by International Gamco, Inc., published 2002.
Double Spin Five Times Pay Advertisement written by IGT, published prior to 2000.
Dual Screen Keno Machine Picture Advertisement, written by Acres Gaming, Inc., published prior to 2003.
Electronic Pull Tabs Advertisement, written by 21st Century Gaming, published prior to 2002.
Five Card Instant Bingo Advertisement written by IGT, published in 2000.
Flamingo Reno-Keno, written by the Flamingo Reno, published prior to 2003.
Four Card Keno Game Screen by IGT, published prior to 2001.
Free Game Keno, written by Keno-Info.com (website: www.keno-info.com/free_keno_game.html), website published 2002, printed on Aug. 11, 2002.
Full House Advertisement, written by Anchor Games, published in 2000.
Gold Fever Advertisement and Game Description written Casino Data System, published in 1997.
Gold Touch Multi-Game Advertisement, written by Cadillac Jack, published prior to 2003.
Instant Bingo Video Slots Advertisement, written by IGT, published 2002.
Instant Winner Advertisement, written by Williams/WMS Gaming, published prior to 2002.
Jackpot Carnival Hyperlink Advertisement, written by Aristocrat, published prior to 2002.
Jewel in the Crown Advertisement, written by IGT, published in 2000.

Keno Advertisement, written by Cyberdyne Gaming, published prior to 2003.
Keno Advertisement, written by Odds on Gaming, published prior to 2003.
Krazy Keno/Star Spangled Keno Advertisement, written by Silicon Gaming, published 2001.
Lucky Times California Lottery Newsletter, published 1996.
Party Time Bingo Advertisement, written by Astra Games Limited, published prior to 2003.
Play it Again Advertisement, written by International Gamco, Inc., published 2000.
Pot O' Gold Advertisement, written by Vision Gaming & Technology, published prior to 2003.
Reel Bingo Advertisement, written by B Soft, published prior to 2003.
Slot Line Mega Jackpots™ Advertisement written by IGT, published in 1997.
Slot Line Progressive Advertisement written by IGT, published in 1993.
Slot Line Progressive Advertisement written by IGT, published in 1994.
Slot Line Progressive Advertisement written by IGT, published in 1995.
Slot Line Temperature Rising Game Description written by IGT, published in 1998.
Southern Gold Advertisement, written by Cadillac Jack, published prior to 2003.
Super 8 Race Advertisement written by IGT, published prior to 2001.
Super Cherry Advertisement written by IGT, published in 2001.
Triple Diamond Keno Paytable, written by IGT, available prior to 2003.
Ultimate Keno Advertisement, written by Bally Gaming Systems, published 2000.
Vision Series Double Diamond Advertisement written by IGT, published prior to 2001.
Vision Series Good Times Advertisement written by IGT, published in 1999.
Vision Series Temperature Rising Advertisement written by IGT, published in 1999.

* cited by examiner

FIG. 5A

| Player | # Matches | % of Total Matches | Payout |
|---|---|---|---|
| A | 6 | 30 | $30 |
| B | 3 | 15 | $15 |
| C | 3 | 15 | $15 |
| D | 2 | 10 | $10 |
| E | 2 | 10 | $10 |
| F | 1 | 5 | $5 |
| G | 1 | 5 | $5 |
| H | 1 | 5 | $5 |
| I | 1 | 5 | $5 |
| **TOTAL** | **20** | **100** | **$100** |

FIG. 5B

| Player | # Matches | Wager Amount | Match X Wager | % of Sum of all Players' [Match X Wager] | Payout |
|---|---|---|---|---|---|
| A | 6 | $0.25 | 1.50 | 5.7143 | $5.71 |
| B | 3 | $1.25 | 3.75 | 14.2857 | $14.29 |
| C | 3 | $4.00 | 12.00 | 45.7143 | $45.71 |
| D | 2 | $1.00 | 2.00 | 7.619 | $7.62 |
| E | 2 | $0.25 | 0.50 | 1.9048 | $1.90 |
| F | 1 | $0.25 | 0.25 | .9524 | $0.95 |
| G | 1 | $5.00 | 5.00 | 19.0476 | $19.05 |
| H | 1 | $0.25 | 0.25 | .9524 | $0.95 |
| I | 1 | $1.00 | 1.00 | 3.8095 | $3.81 |
| **TOTAL** | **20** | | **26.25** | **100** | **$100** |

GAMING SYSTEM AND METHOD PROVIDING A MULTIPLAYER BONUS GAME HAVING A PLURALITY OF AWARD OPPORTUNITIES

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

Some known secondary or bonus games include a group gaming aspect, wherein a plurality of players playing at linked or related gaming devices participate in a group event for one or more bonus awards. Some multiplayer bonus games pay a large amount to one of the players and additional amounts to the other players, but the awards are relatively random. It is generally difficult for players to understand their interest or involvement in the bonus game until a payout has been awarded.

To increase player enjoyment and excitement with gaming devices, it is desirable to provide new and different multiplayer bonus games wherein players have a sense of their stake in the bonus game.

SUMMARY

The present disclosure generally relates to gaming systems and methods, and more particularly, to a gaming system and method providing a multiplayer bonus game. In one embodiment of the present disclosure, the gaming system includes a central server, central controller, or remote host configured to communicate with a plurality of gaming devices. Each of the gaming devices of the gaming system includes at least one primary or base game operable upon a wager by a player. The bonus game of the gaming system includes a plurality of game elements. In operation, the gaming devices of the gaming system enable players to place wagers to initiate plays of the primary games. Players who are playing the primary games at the gaming machines are regularly or occasionally provided with (such as by awarding, earning, or buying) one or more game elements for the bonus game. In other words, each player playing at one of the gaming machines accumulates game elements for the bonus game.

Upon an occurrence of a bonus game triggering event, the bonus game initiates. In one embodiment, the bonus game is triggered when all of the game elements associated with the bonus game have been awarded to the players during primary game play. Once the bonus game is triggered, in one embodiment, the controller or central server randomly selects a plurality of the game elements of the bonus game and compares the selected game elements to the game elements respectively acquired or accumulated by or for each of the players. In one embodiment, the controller or central server provides one or more bonus awards to one or more of the players based on the number of game elements each player has acquired that match, correspond, or have a designated relationship to the game elements randomly selected during the bonus game. Thus, in one embodiment, each game element obtained during primary game play represents one of a plurality of finite opportunities to win an award in the bonus game.

It should be appreciated that the multiplayer bonus game of the present disclosure occurs apart from or in addition to the primary games. Players acquire game elements during primary game play, and the gaming system determines the value of those game elements during the bonus game, which occurs at a later point in time. In one embodiment, the bonus game includes a limited number of game elements and when a designated number, such as all, of the game elements are acquired or accumulated by or for the players, the bonus game begins. In one embodiment, the players race to acquire the most game elements prior to the start of the bonus game to increase their bonus awards or chances of winning bonus awards.

In one embodiment, only players who are actively playing at one of the gaming devices (i.e., in active status) are eligible to participate in the multiplayer bonus game. In one such embodiment, a player is in active status if that player is placing wagers on plays of the primary game at a predefined minimum rate. In the case where a player cashes out of a game or stops playing on his or her respective gaming machine, that player's game elements are returned and may be subsequently awarded to other players who are still actively playing at one of the gaming machines. This helps to ensure that bonus awards are provided to players who are actually participating in game play and reduces the chance that players will wait for gaming machines where previous players have already earned a high number of a game elements positions to become available.

In one embodiment, the bonus game is a multiplayer keno-type game. In such an embodiment, as the players play the primary games, the players are occasionally awarded one or more of a limited number of positions on a multiplayer keno board. In various alternative embodiments, players may be awarded positions on the multiplayer keno board based on randomly occurring events, such as random symbol generations or mystery triggers, based on an amount of money wagered, based on a number of primary games played, based on time, based on player status, based on a random time of day, based on player buy-in, based on any other suitable criteria, or based on a combination of these. In one embodiment, players are awarded positions on the multiplayer keno board based on events which occur during primary game play. In other embodiments, one or more of the players may be provided with game elements based on events that occur during other bonus games being played by the players.

In one example embodiment, each position on the keno board is unique, and there are a total of 80 positions on the board. In certain embodiments, when a player earns a position on the multiplayer keno board, the position is assigned randomly or in some predefined order, such as next to squares previously awarded to that player. In one embodiment, when it is determined that a player has earned a position on the multiplayer keno board, that player has the opportunity to select a position on the board. In one embodiment, a player may be awarded and/or select a plurality of positions on the multiplayer keno board. For example, a player may obtain an entire line or block of positions on board.

In one embodiment, once all of the spaces on the keno board have been awarded to the players playing at the gaming devices (i.e., once the keno board is full), the bonus game is triggered and played. In another embodiment, the bonus game is triggered once a predetermined number of spaces on the keno board have been awarded to the players. In such an embodiment, the bonus game may be triggered more frequently. In such embodiments, there is no guarantee that any of the players will win in the bonus game since one or more of the spaces on the keno board may not have been awarded to any of the players. Thus, the gaming system may offer bigger awards in the bonus game. In other embodiments, the bonus game is triggered randomly. In one embodiment, the bonus game is triggered on a periodic basis. In one such embodiment, the amount that players can win in the bonus game is based on how frequently the bonus game is triggered. For example, if the bonus game is triggered hourly, the potential award is small. However, if the bonus game is triggered once a day or once a week, the potential award is significantly larger.

In one embodiment, after the bonus game is triggered, the bonus game is played like a typical keno game. That is, 20 random numbers are drawn from a pool of 80 numbers and the selected numbers are displayed to the players. As numbers are drawn, players are provided with an indication or notification that they have achieved a match. Once all numbers are drawn and the matches are evaluated, payouts are provided to the players accordingly.

In one embodiment, players are provided with bonus payouts based on the number of positions they match. In one embodiment, a total bonus payout associated with the bonus game is divided among the players based on the number of matches each player achieves. In one embodiment, players who have acquired a greater number of positions on the multiplayer keno board will have a better chance of winning an award in the bonus game.

In one embodiment, the total bonus payout available for the bonus game is a fixed amount. In such an embodiment, players with more matches are paid a higher amount or a higher portion of the fixed bonus payout amount. In another embodiment, the award provided to each player is determined based on the number of matches obtained by that player and the player's wager amount. In such an embodiment, players who wager more have the opportunity to win a larger portion of the total bonus payout. In other embodiments, bonus awards are based on a paytable for the number of matches. In such embodiments, the total bonus payout may vary from game to game. In another embodiment, the total bonus payout is a progressive amount which grows based on primary game play until the bonus game is triggered.

It should be appreciated that, in various alternative embodiments, the multiplayer bonus game is not limited to a keno game. For example, the multiplayer bonus game could be any type of game, such as but not limited to: (a) a slot game, where players accumulate symbols; (b) a card game, where players accumulate cards; (c) a treasure map game or geographical map game, where players accumulate points on the map; (d) a bingo game, where players accumulate positions on a bingo board; (e) a lottery game, where players accumulate symbols or numbers; (f) any suitable type of board game, where players accumulate positions on the board; (g) a racing game, where players progress along a track or compete in a race; (h) a game wherein players accumulate points to advance along one or more paths; (i) a selection game, where players accumulate a number of selections that they can make from a plurality of selections; (j) a wheel game, where players accumulate sections or indicators associated with the wheel; and (k) any other suitable type of game.

It should also be appreciated that, in certain embodiments, the gaming system of the present disclosure provides a plurality of multiplayer bonus games which occur simultaneously or in an overlapping manner. In one such embodiment, the plurality of multiplayer bonus games are the same type of game. In another embodiment, a plurality of the multiplayer bonus games are different types of games. For example, as players play at their respective gaming devices in the gaming system, the players can obtain positions on a multiplayer bonus keno board, as well as on a multiplayer bonus bingo board.

It is therefore an advantage of the present disclosure to provide a gaming system which enables players to have a sense of what to hope for as they play their primary game and in the bonus game.

Another advantage of the present disclosure is to provide a gaming system wherein, once a player is awarded a bonus game element, they have a vested interest in playing until the bonus game initiates.

A further advantage of the present disclosure is to provide a gaming system which provides increased frequency of bonus play, such that the players actually have a chance of winning a bonus.

Additional features and advantages of the disclosed embodiments are described in, and will be apparent from, the following Detailed Description of the Invention and the Figures.

BRIEF DESCRIPTION OF THE FIGURES

FIG. 5A provides a table illustrating one method for providing bonus awards in the multiplayer bonus game of the present embodiment.

FIG. 5B provides a table illustrating another method for providing bonus awards in the multiplayer bonus game of the present embodiment.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
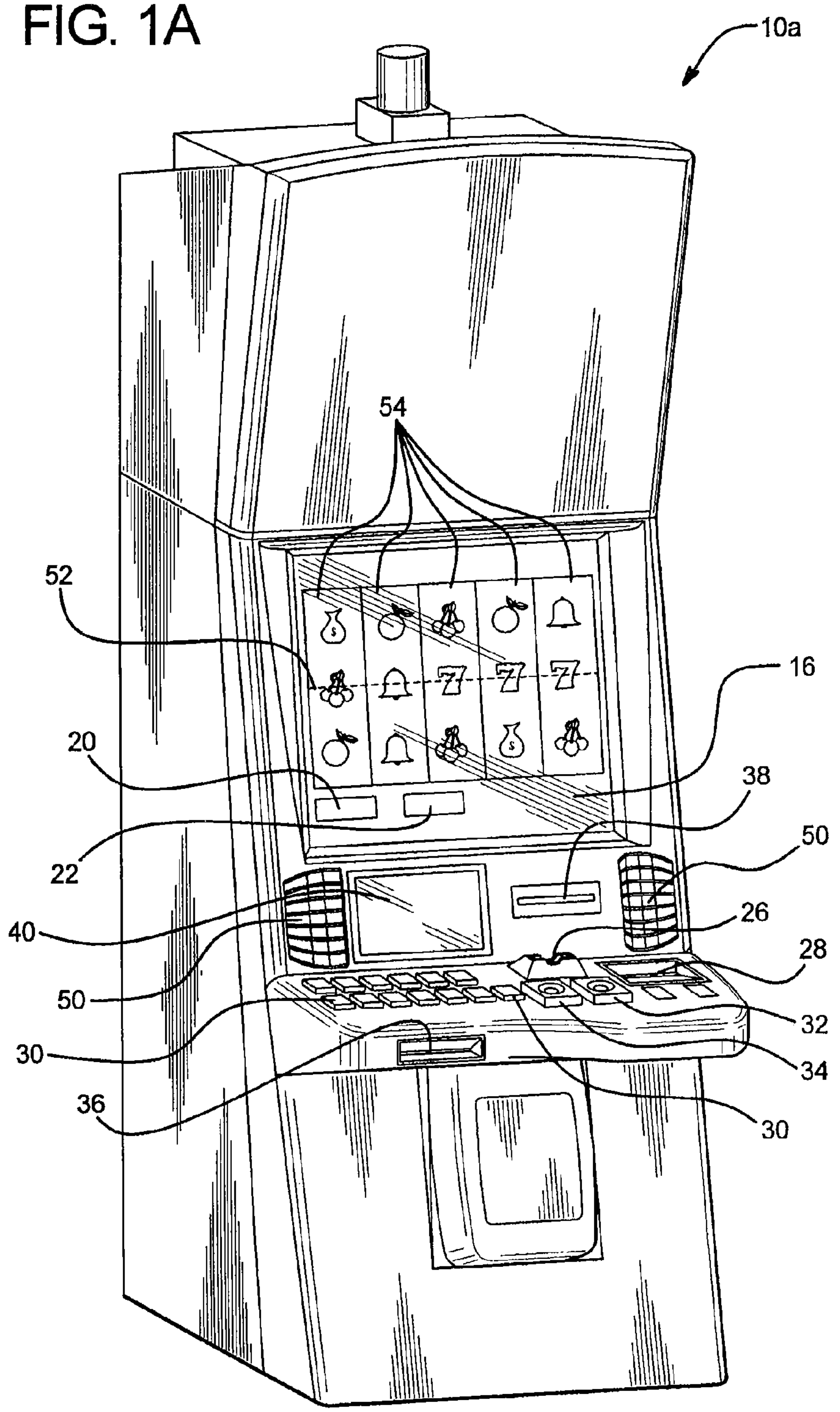
FIGS. 1A and 1B are perspective views of example alternative embodiments of the gaming device of the present disclosure.
Figure 1B:
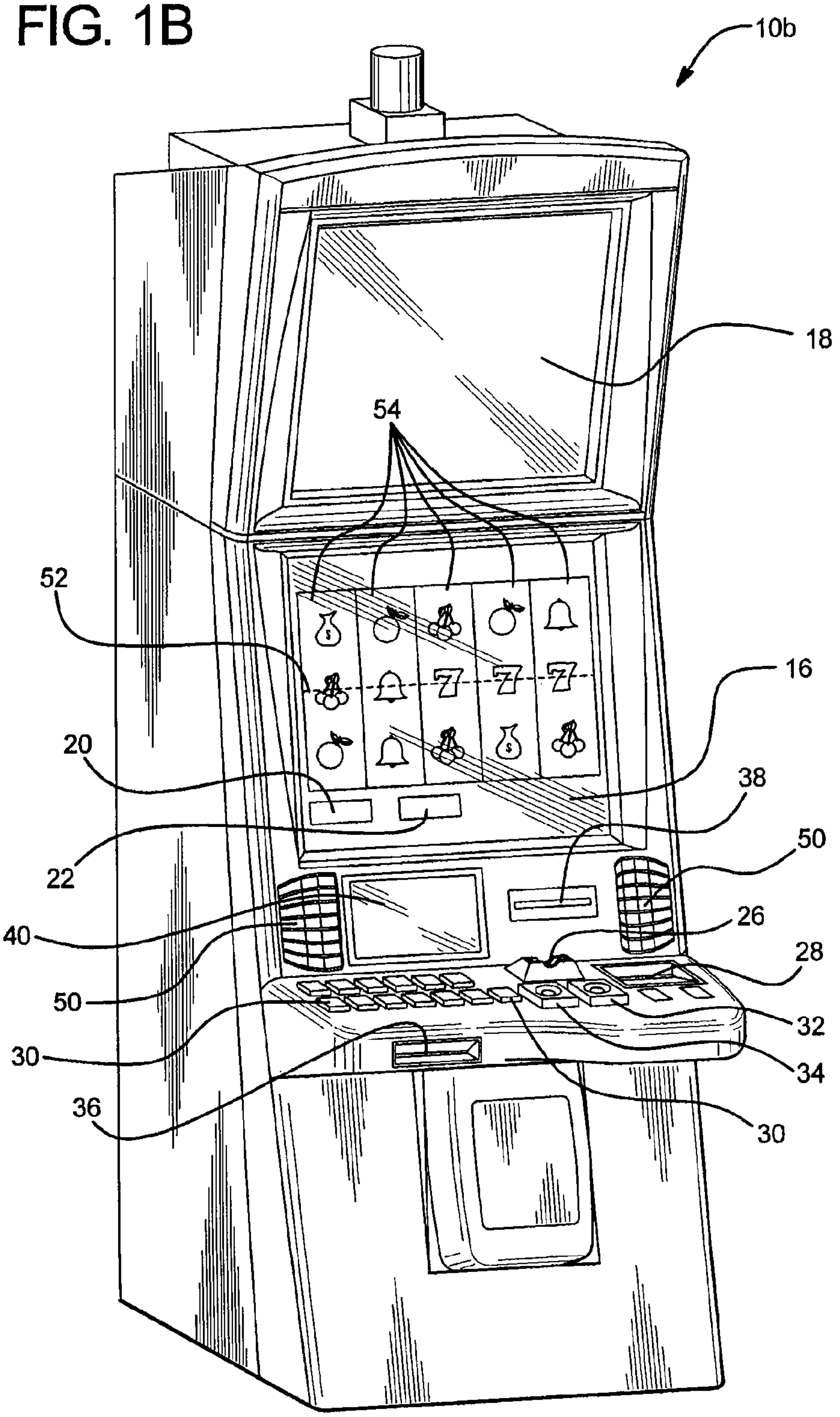

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
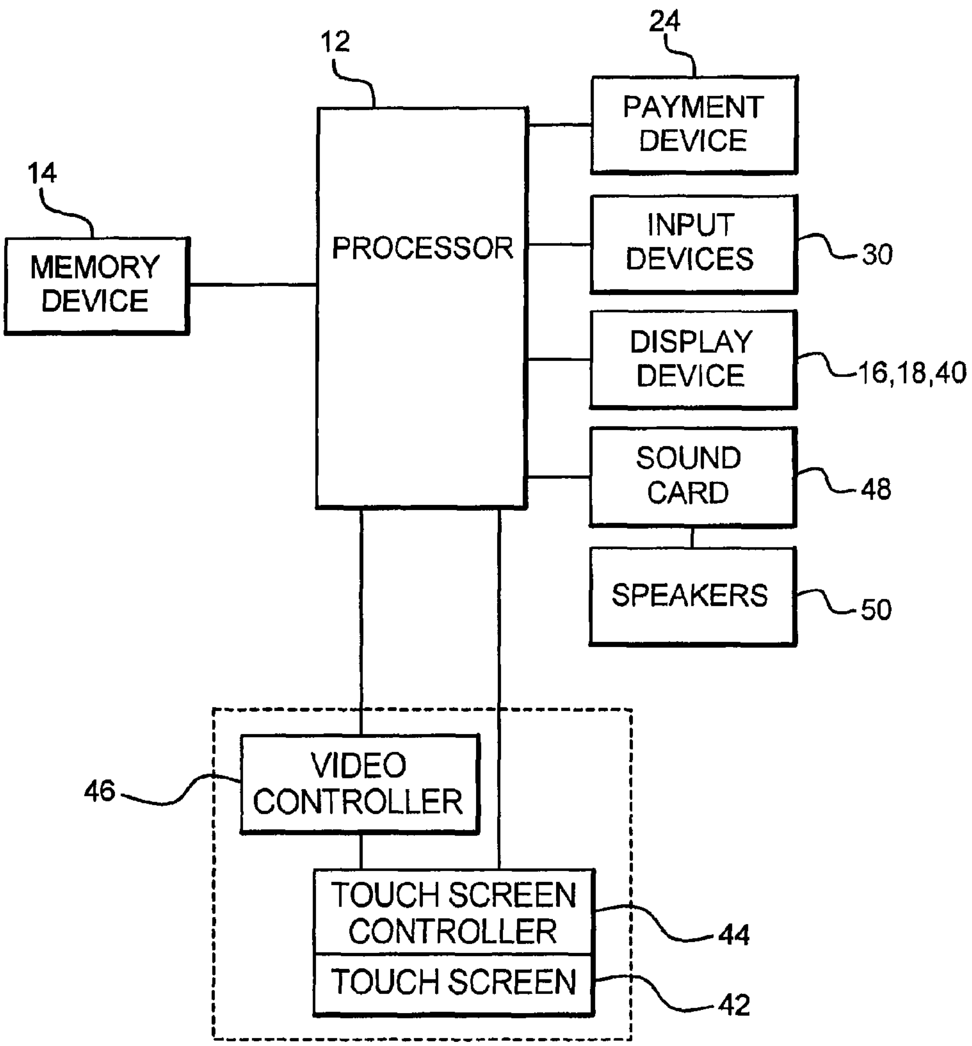
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
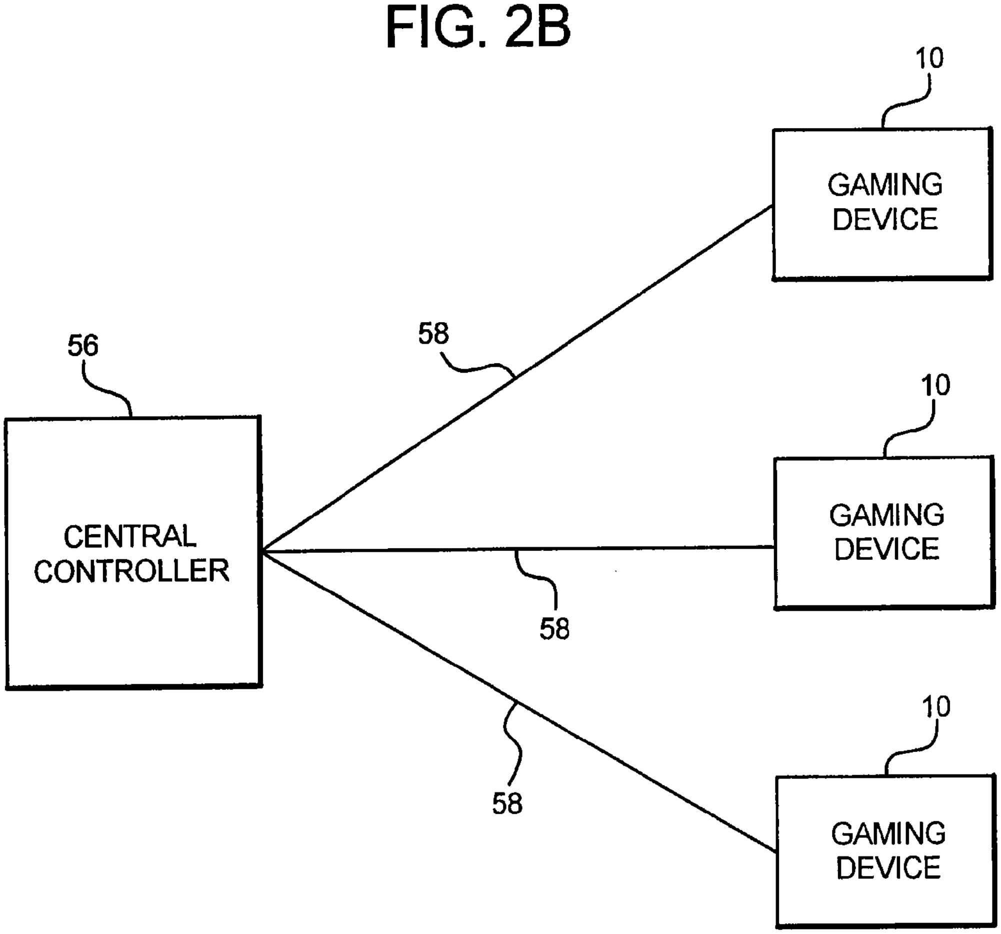
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multiplayer Bonus Game

Figure 3A:
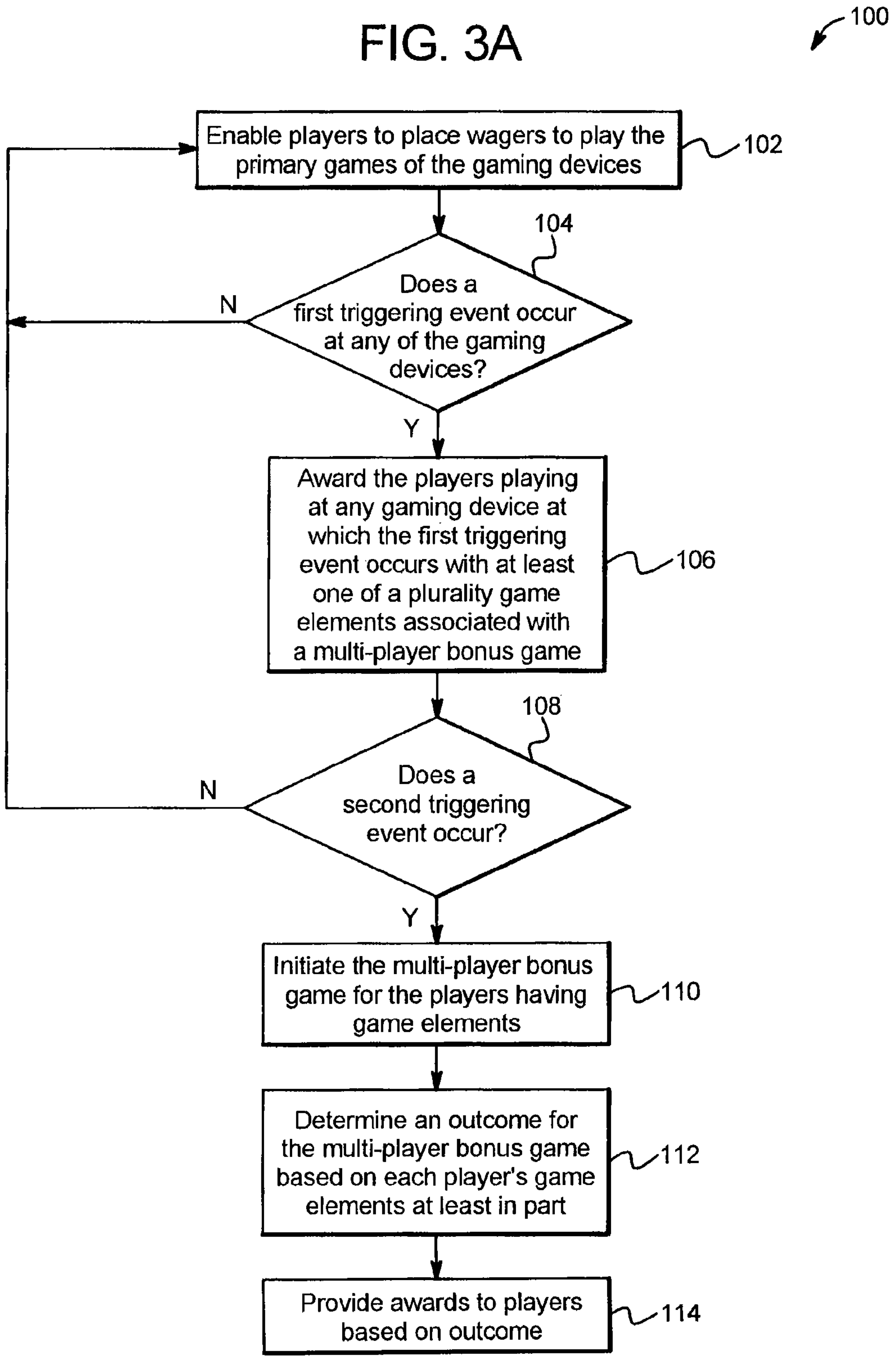
FIG. 3A is a flow chart illustrating one embodiment of the present disclosure.

Referring now to FIG. 3A, one embodiment of the present disclosure operates according to sequence 100. In one embodiment, a gaming system includes a central server or controller configured to communicate with or link to a plurality of gaming machines or gaming devices. Another embodiment of the present disclosure provides a gaming system having a plurality of linked gaming devices where one of the gaming devices functions as the central server or controller. Each of the gaming devices includes at least one primary or base game operable upon a wager by a player. In some embodiments, each gaming device may have one or a plurality of different primary games. In certain embodiments, the primary games of each gaming device or a plurality of the gaming devices may be the same games or different games. The gaming system further includes at least one multiplayer secondary or bonus game operable upon a secondary or bonus game triggering event. In one embodiment, the multiplayer bonus game is associated with a plurality of game elements.

As indicated by block 102, the gaming devices of the gaming system enable players to place wagers on plays of the primary games. The gaming system determines whether a first triggering event occurs at any of the gaming devices, as indicated by block 104. If the first triggering event does not occur, players may continue making wagers to play their respective primary games. In one embodiment, if the first triggering event occurs at any of the gaming devices, the gaming system awards each of the players playing at one of the gaming devices at which the first triggering event occurred with at least one of the game elements associated with the group bonus game, as indicated by block 106. It should be appreciated that, in alternative embodiments, the gaming system provides the game elements to the gaming devices rather than to individual players. In such embodiments, the gaming devices accumulate the game elements. Thus, if a player discontinues playing on a particular gaming device, the accumulated game elements remain associated with that gaming device.

As indicated by block 108, the gaming system determines whether a second triggering event occurs. If the second triggering event does not occur, the players are enabled to place wagers to continue playing the primary games. It should be appreciated that, as the players play the primary games, the players have the opportunity to accumulate more game elements for the multiplayer group bonus game. It should also be appreciated that the multiplayer bonus game occurs apart from or in addition to the primary games occurring on the gaming devices. If the determination is made that the second triggering event occurs, the multiplayer bonus game initiates, as indicated by block 110.

Once the multiplayer bonus game is triggered, the gaming system determines a multiplayer bonus game outcome based at least in part on the game elements awarded to each of the players participating in the multiplayer bonus game, as indicated by block 112. The gaming system provides bonus awards to the players based on the multiplayer bonus game outcome, as indicated by block 114.

Figure 3B:
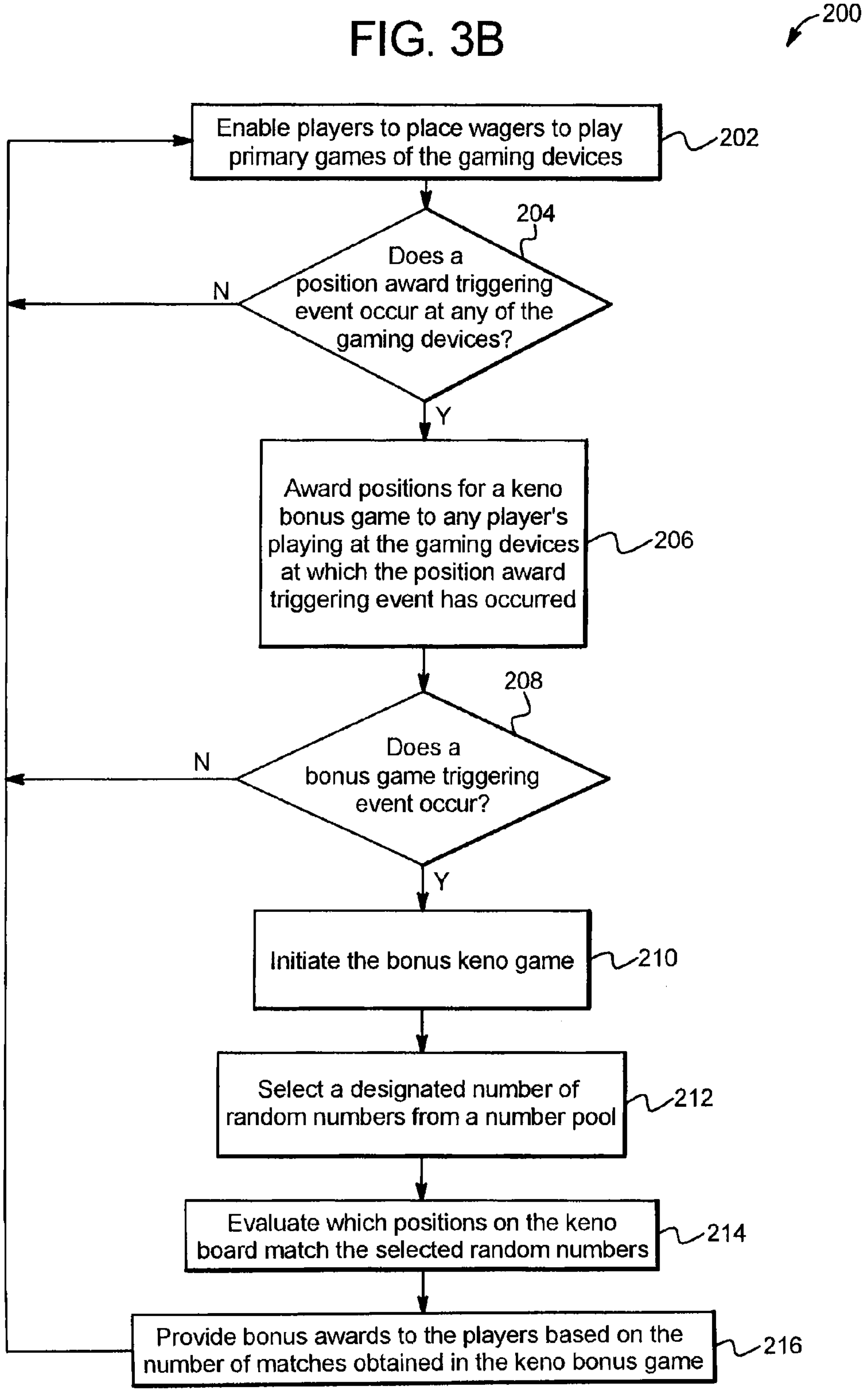
FIG. 3B is a flow chart illustrating one embodiment of the present disclosure, wherein the multiplayer bonus game is a keno type game

Referring now to FIG. 3B, one embodiment of the present disclosure operates according to sequence 200. In this embodiment, the multiplayer bonus game is a keno type game. The multiplayer keno game is associated with a multiplayer keno board which includes a plurality of positions. As indicated by block 202, the players at the gaming devices in the gaming system are enabled to place wagers on plays of the primary game of their respective gaming devices. As players play the primary games, the players are occasionally awarded one or more positions on the multiplayer keno board. More specifically, as indicated by block 204, the gaming system determines whether a position award triggering event occurs at any of the gaming devices during primary game play. If a position award triggering event occurs at any of the gaming devices, the player playing at that gaming device is awarded one or more positions on the multiplayer keno board, as indicated by block 206. If no position award triggering event occurs at any of the gaming devices, the players may continue placing wagers to play the primary games, as indicated by block 202. It should be appreciated that, in various embodiments, the multiplayer bonus game occurs apart from or in addition to the primary games occurring on the gaming devices. The players play their respective primary games and acquire positions on the keno board which will subsequently be used in the multiplayer keno bonus game.

In various alternative embodiments, players may be awarded positions on the multiplayer keno board randomly, based on an amount of money wagered, based on time, based on player status, based on a random time of day, based on player buy-in, based on any other suitable criteria, or based on a combination of these. In another embodiment, players may be awarded positions on the multiplayer keno board players based on tickets or coupons which award positions. For example, a player may receive a coupon as a promotion for joining the player tracking club, and the coupon awards the player one or more positions on the multiplayer keno board automatically or after the player has played or wagered a designated amount. In one embodiment, players are awarded positions on the multiplayer keno board based on events which occur during game play. For example, players earn spots based on (i) symbol combinations generated during game play, (ii) a designated number of wins obtained during game play; (iii) a designated number of losses obtained during game play, and (iv) exceeding a certain amount of game play (such as number of games, number of credits, amount of time), (v) reaching a specified number of points earned during game play; (vi) any other suitable event relating to game play; and (vii) any combination of these.

In one example embodiment, there are a total of 80 positions on the multiplayer keno board, and each position on the multiplayer keno board is unique. In certain embodiments, when a player earns a position on the multiplayer keno board, the position is assigned randomly or in some predefined order, such as next to squares previously awarded to that player. In another embodiment, when it is determined that a player has earned a position on the multiplayer keno board, that player has the opportunity to select the position. In one embodiment, a player may be awarded and/or select a plurality of positions on the multiplayer keno board at a time. For example, a player may obtain an entire line or block of positions on board. In one embodiment, players can select positions as the positions are awarded. In another embodiment, players are required to fill out a virtual keno card in advance to specify their desired positions in order of preference. In some embodiments, players may buy, sell, and/or trade positions with one another. In certain embodiments, more than one player may acquire the same position. In other words, there may be an overlap of positions by multiple players.

It should be appreciated that, in other embodiments, rather than earning positions on a keno board, players can earn spots on any kind of bonus board for any type of multiplayer bonus game. For example, a player may earn squares on a treasure map or square on a geographic map.

Referring again to FIG. 3B, as indicated by block 208, the gaming system determines whether a bonus game triggering event occurs. Upon an occurrence of the bonus game triggering event, the multiplayer bonus game initiates, as indicated by block 210. In one embodiment, the multiplayer bonus game is triggered when all of the positions on the multiplayer keno board have been awarded to the players playing at the gaming devices. That is, the multiplayer bonus game begins once the multiplayer keno board is full. In another embodiment, less than all of the positions on the multiplayer keno board must be filled to initiate the multiplayer bonus game. In one embodiment, the multiplayer bonus game is triggered randomly. In another embodiment, the multiplayer bonus game is triggered on a periodic basis. In such embodiments, the amount that players can win in the multiplayer bonus game is based on how frequently the bonus game is triggered. For example, if the multiplayer bonus game is triggered hourly, the potential award is small. However, if the multiplayer bonus game is triggered once a day or once a week, the potential award is significantly larger. In one embodiment, the multiplayer bonus game is triggered frequently for smaller payout amounts, rather than building large jackpots, to increase excitement and volatility in the game.

As indicated by block 212, once the multiplayer bonus game is triggered, the gaming system selects a designated number of random numbers from a pool of numbers. For example, the gaming system selects 20 random numbers from a pool of 80 numbers, as in a typical game of keno. In one embodiment, the selected numbers are displayed to the players. As indicated by block 214, the gaming system evaluates whether any of the positions of the multiplayer keno board correspond to one of the numbers randomly selected during the multiplayer bonus game. Players who have a position that corresponds to one of the selected numbers obtain a match. As indicated by block 216, once all of the numbers are drawn and any matches are determined, the gaming system provides awards to the players who obtained matches in the multiplayer bonus game.

Once the gaming system determines and provides awards to players with matches in the multiplayer bonus game, the players may place wagers to continue playing their respective primary games, as indicated by block 202. In one embodiment, after the multiplayer bonus game is completed, the player positions on the multiplayer keno board are cleared and a new bonus round begins. Thus, as the players play the primary games, they will have the opportunity to obtain new positions on a multiplayer keno board for a next round of the multiplayer bonus game. In other embodiments, only the positions resulting in wins are cleared, or one or more positions are randomly cleared. In one embodiment, certain outcomes in the multiplayer bonus game cause a player to be awarded further positions on a separate bonus board associated with a different bonus event or a tournament.

In one embodiment, a player does not have to continue playing on his or her gaming device until the multiplayer bonus game is triggered for his or her positions to remain valid. That is, a player may stop playing on the gaming device before the multiplayer bonus game is triggered and check back to see the results of the bonus game. In one such embodiment, a player must achieve a designated qualifying condition before the player can discontinue playing on his or her gaming device yet still participate in the multiplayer bonus game. For example, a player must wager a threshold amount before that player can stop playing on the gaming device and still participate in the multiplayer bonus game.

Referring now generally to FIGS. 4A to 4F, in one example embodiment of the present disclosure, a gaming system enables players to play in a multiplayer keno bonus game. In this embodiment, the gaming system includes a central server or controller 56 and a plurality of gaming machines or gaming devices. The gaming system may include any suitable number of gaming devices configured to communicate with or link to the central server or controller 56. The gaming devices may be the same type or different types of gaming devices.

Figure 4A:
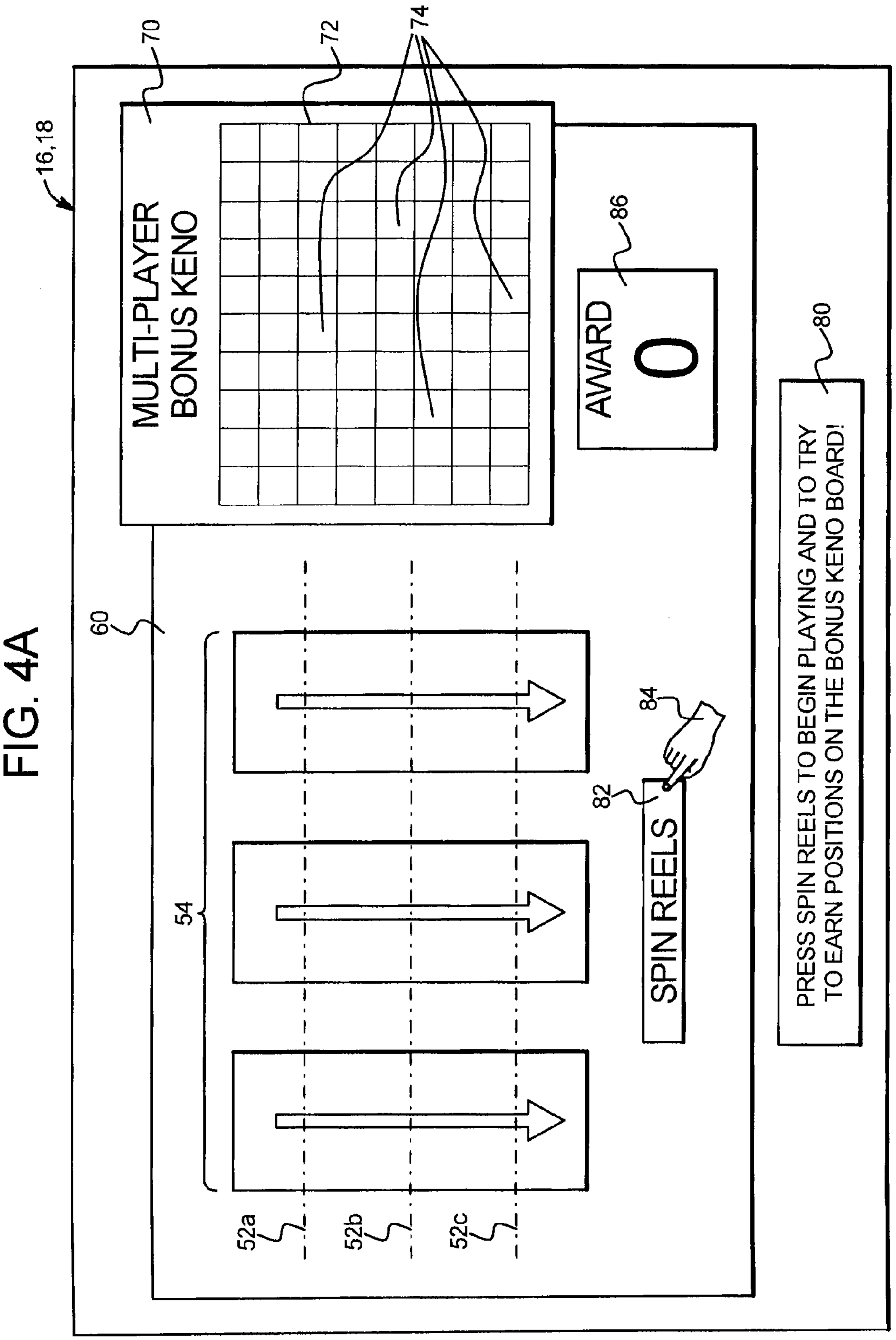
FIGS. 4A, 4B, 4C, 4D, 4E, and 4F illustrate screen shots for one player who is participating in a multiplayer bonus keno game.

FIG. 4A illustrates the display device 16 of a first player 84 playing at one of the gaming devices in the gaming system (i.e., Player A). The display device 16 includes a primary game display 60 which includes a plurality of reels 54 associated with a plurality of paylines 52*a*, 52*b*, 52*c*. The display device 16 also includes a spin reels button 82 and an award meter 86, which indicates that Player A 84 has a current score of 0 in the game. The display device 16 further includes a message box 80 for providing information regarding game play. In addition to the primary game display 60, the display device 16 provides a separate display window 70 for displaying the multiplayer bonus keno game. Thus, as the player plays the primary game of the gaming device, the player can see information regarding the multiplayer bonus keno game. As seen in FIG. 4A, the multiplayer bonus keno game includes a multiplayer keno board 72 having a plurality of positions 74. In this example, the multiplayer keno board 72 includes 80 positions. In FIG. 4A, Player A 84 has pressed the spin the reels button 82, and the reels 54 spin for the first time.

It should be appreciated that in the illustrated embodiment the bonus game and any information relating to the multiplayer bonus game, is displayed to each player on his or her individual gaming device. However, in other embodiments, instead of or in addition to displaying the multiplayer bonus game on the individual gaming devices, the gaming system is associated with a shared display configured to display information relating to the multiplayer bonus game. In one such embodiment, the shared display is connected to or is adjacent to a plurality or all of the gaming devices of the gaming system. In one embodiment, the gaming devices are positioned and spaced apart substantially equally about the shared display.

Figure 4B:
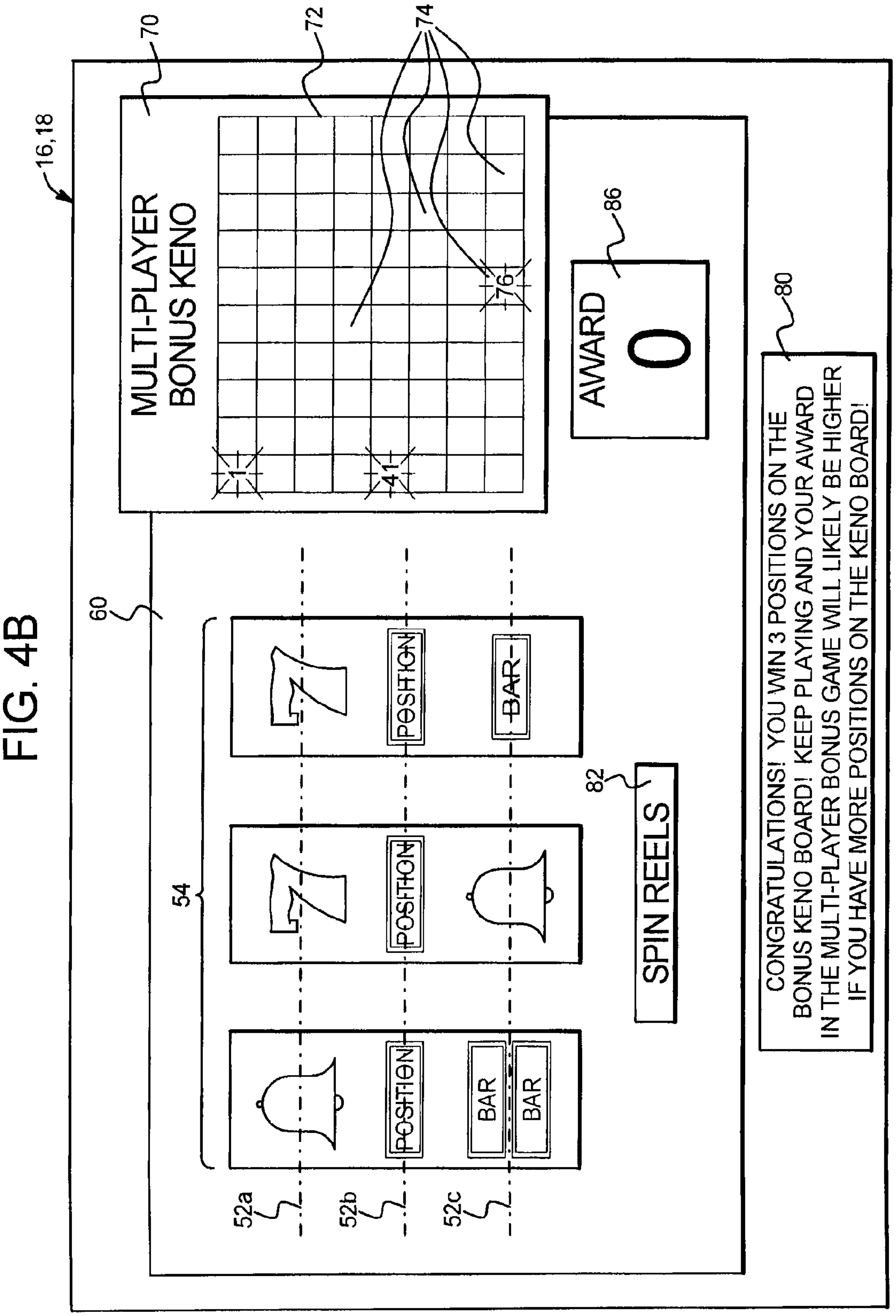

As illustrated in FIG. 4B, the reels 54 have generated three "position" symbols on the center payline 52*b*. In this example, for each position symbol generated on the paylines, the player earns a position on the multiplayer keno board 72. Accordingly, the display device 16 displays a message in the message box 80 indicating that Player A 84 has earned three positions on the multiplayer keno board 72. The message also encourages Player A 84 to playing and earning more positions on the multiplayer keno board 72. Having more positions on the multiplayer keno board 72 increases the average expected bonus award for Player A 84 in the multiplayer bonus game.

It should be appreciated that, as other players playing at gaming devices in the gaming system play their respective primary games, those players have the opportunity to earn positions on the multiplayer keno board, as well. When all of the positions on the multiplayer keno board are filled, the multiplayer keno bonus game will initiates, as described in more detail below.

Once it is determined that Player A 84 has earned three positions on the multiplayer keno board, the gaming system randomly selects three of the positions 74 to award to Player A 84. The selected positions are associated with the numbers 1, 41, and 76, as indicated in the display window 70. In this example, the positions awarded to Player A 84 are illuminated to indicate that Player A 84 has earned those particular positions. In other embodiments, when positions are awarded to a player, the positions are marked with the player's avatar, initials, a personal message, or any other suitable player identifier.

Figure 4C:
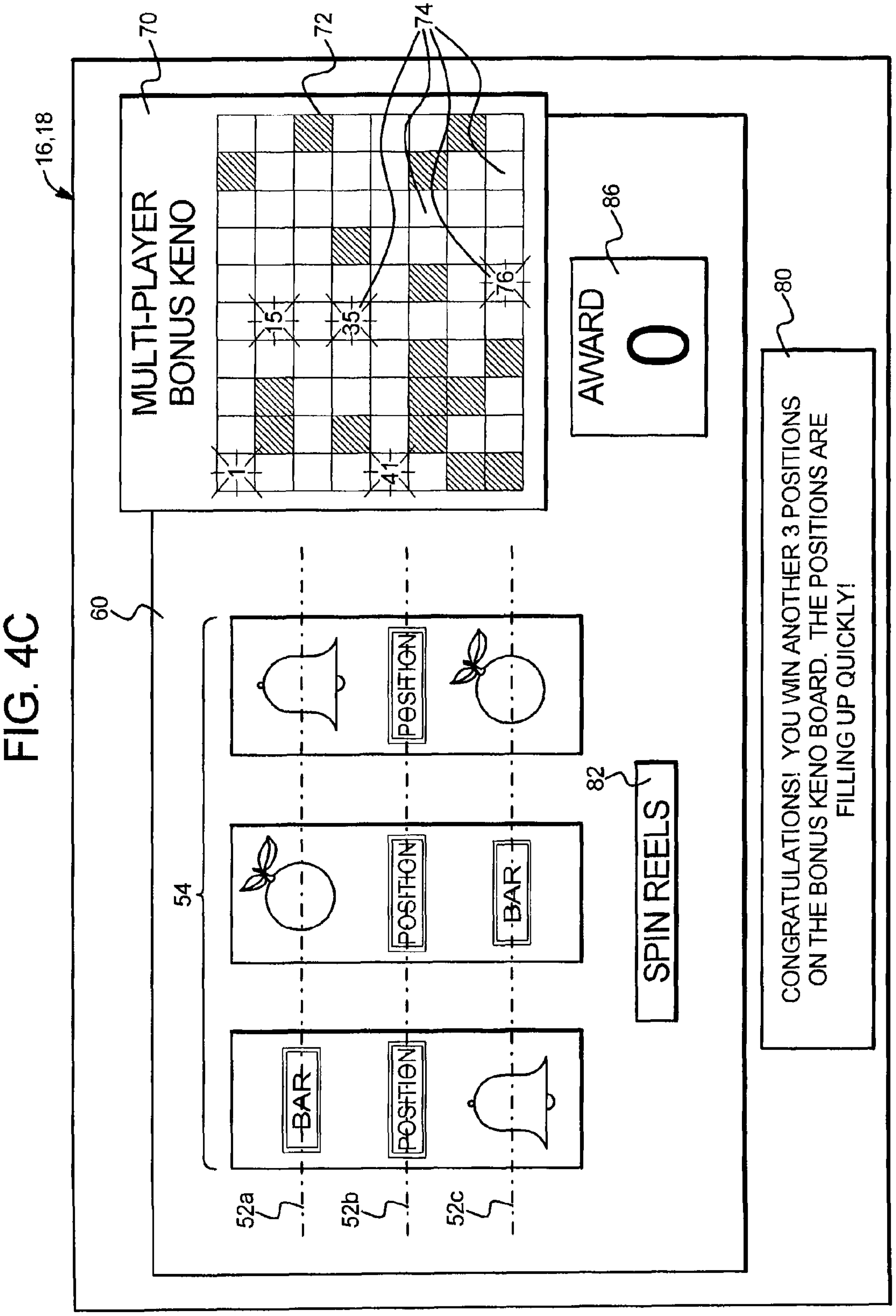
Figure 4D:
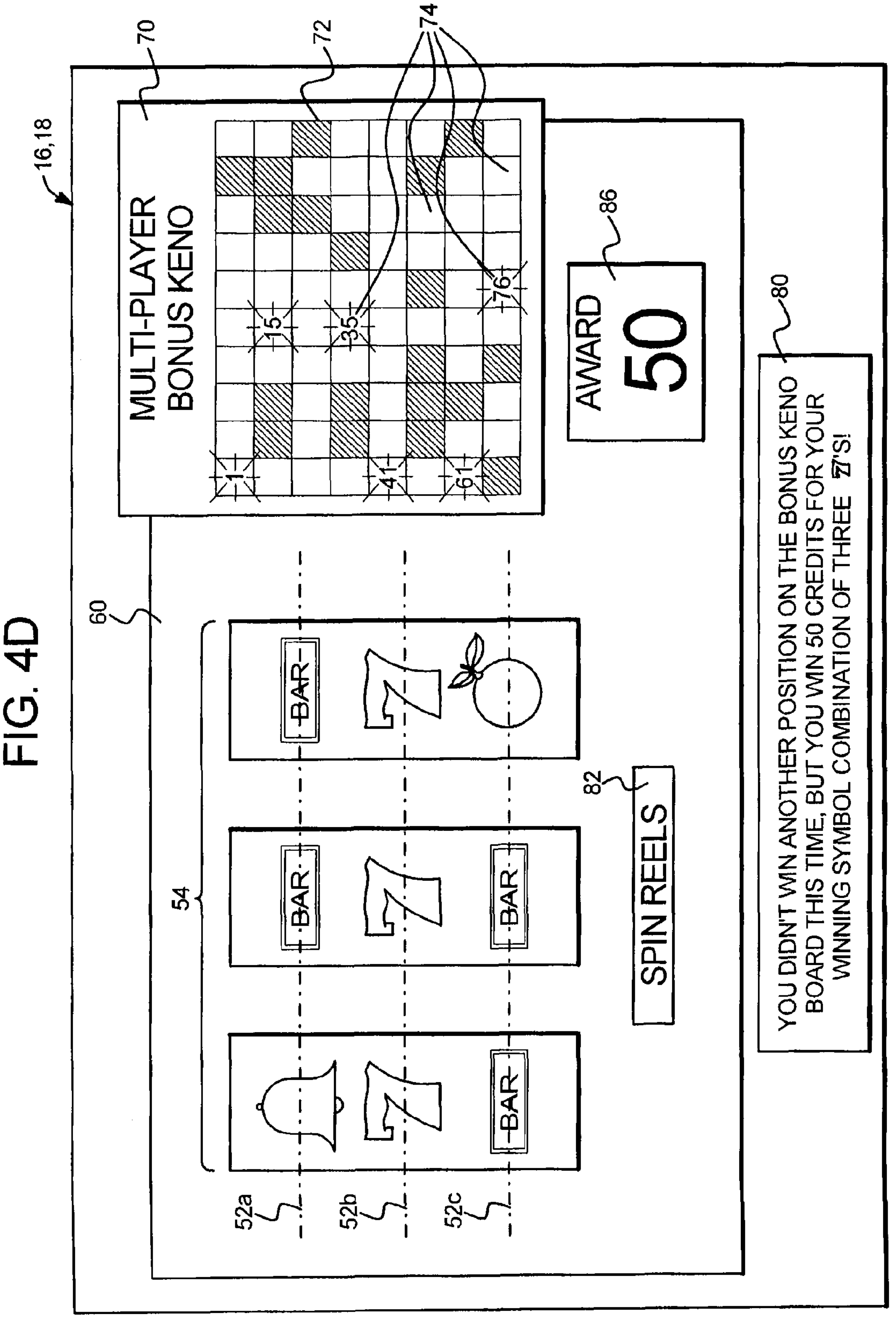

As seen in FIG. 4C, the reels 54 spin for the second time and generate another three position symbols on the center payline 52*b*. Accordingly, Player A 84 wins another 3 positions on the multiplayer keno board 72, as indicated by the message displayed in the message box 80. The display window 70 shows the positions corresponding to the numbers 15, 35, and 61 illuminated (in addition to the previously earned positions corresponding to the numbers 1, 41, and 76) to indicate to Player A 84 which positions Player A 84 has obtained. The display window 70 also shows the positions on the multiplayer keno board 72 that have been awarded to other players. In this example, the positions obtained by other players are shaded, as indicated on the multiplayer keno board 72. It should be appreciated that the positions may be marked or labeled in any suitable manner to indicate to players that those positions are no longer available.

As seen in FIG. 4D, the reels 54 spin again and Player A 84 obtains a winning symbol combination which includes three 7 symbols. The reel spin did not result in an award of another position on the multiplayer keno board 72. However, Player A 84 nevertheless wins 50 credits for the winning symbol combination. Accordingly, the award meter 86 displays the number 50.

Figure 4E:
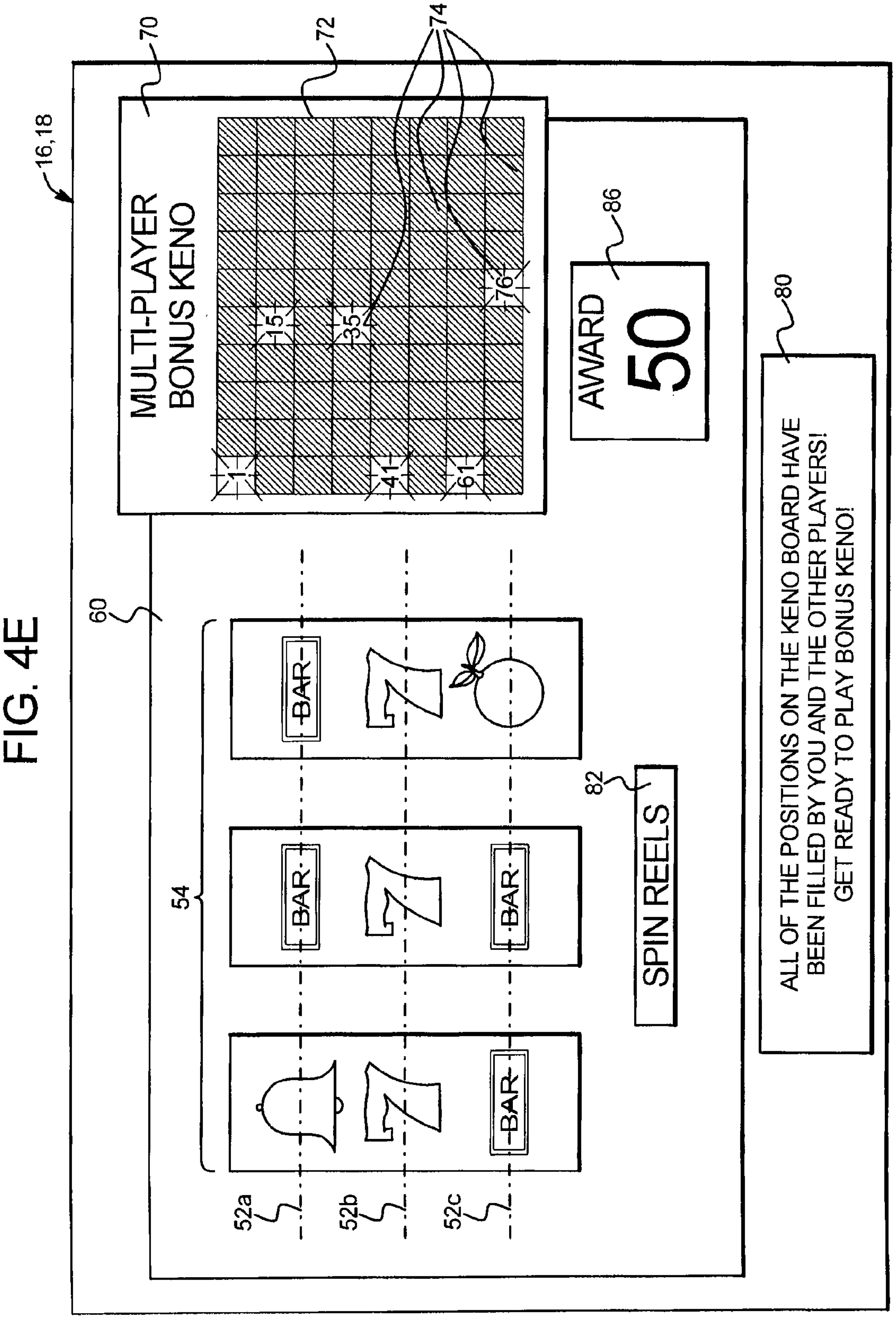

Player A 84 continues to play the primary game of the gaming device, as do any other players playing at the gaming devices of the gaming system, until a bonus game triggering event occurs. In one embodiment, the bonus game triggering event occurs when all of the positions on the multiplayer keno board 72 have been awarded to the players. In FIG. 4E, all of the positions 74 on the multiplayer keno board 72 are either shaded or illuminated, which indicates that each of the positions has been awarded to a player. Therefore, the multiplayer bonus keno game will begin. Player A 84 has two positions on the multiplayer keno board 72 (i.e., the positions corresponding to the numbers 15 and 76) when the multiplayer bonus keno game is triggered.

Figure 4F:
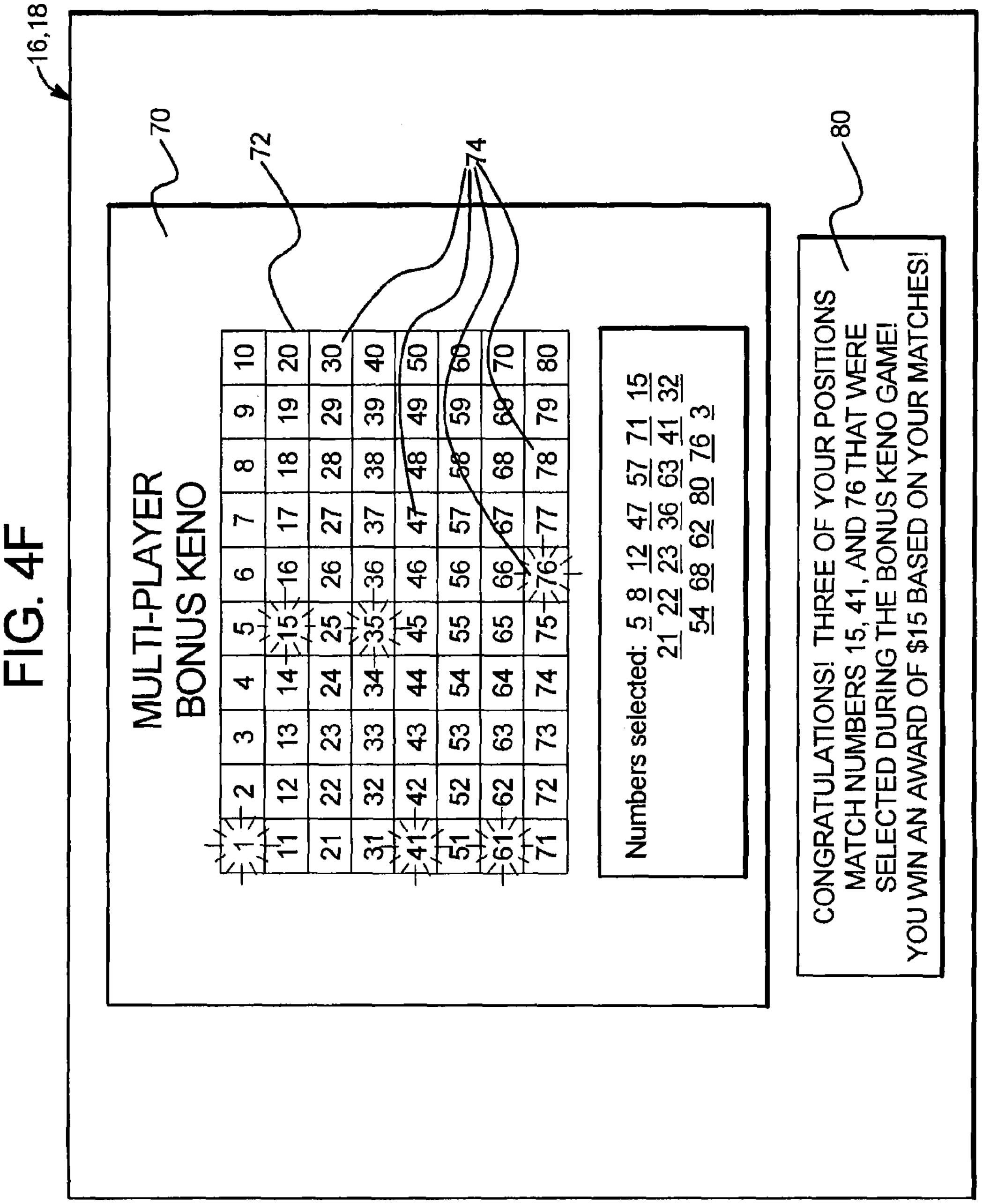

As illustrated in FIG. 4F, the multiplayer bonus keno game initiates, and the display window 70 expands to cover the primary game display 60. During the multiplayer bonus keno game, a designated number of random numbers are selected. In this example, twenty numbers are selected from a pool of numbers, which includes the numbers 1 to 80. After the 20 numbers are selected, the gaming system determines which of the players have positions on the multiplayer keno board 72 that match the selected numbers. As indicated by the message box 80, Player A 84 has two matches. That is, the numbers 15 and 76 were selected in the multiplayer bonus keno game, and those numbers match the positions awarded to Player A 84 during primary game play. The gaming system compares each players' positions on the multiplayer keno board 72 to the selected numbers to determine which of the players have obtained matches and, therefore, will win a bonus award. The gaming system provides Player A 84 with a bonus award of $15 dollars based on Player A's number of matches in the multiplayer bonus keno game.

In one embodiment, the bonus awards provided to each of the players are linearly related to the number of positions matched by that player. For example, if a player has three matches in the multiplayer bonus keno game, the player wins three awards. In one embodiment, awards are assigned to certain positions on the keno board. In one such embodiment, the awards are revealed when their corresponding positions match a selected number in the multiplayer bonus keno game. In one embodiment, the bonus awards include awards based on a paytable associated with the multiplayer bonus game, such as a standard keno paytable. In another embodiment, the bonus awards include static or dynamic awards which are divided among the players based on each player's relative performance in the bonus game.

In one embodiment, the multiplayer bonus game is associated with a total bonus payout. In one such embodiment, the total bonus payout is divided among the players based on the number of matches each player achieves in the multiplayer bonus game. In one embodiment, the total bonus payout is a fixed amount. For example, as illustrated in FIG. 5A, the total bonus payout for the bonus game is $100. The table of FIG. 5A shows the following results for the bonus game: (i) Player A obtained 6 matching positions; (ii) Player B and Player C each obtained 3 matching positions; (iii) Player D obtained 2 matching positions; and (iv) Player F, Player G, Player H, and Player I each obtained 1 matching position. The players achieved a combined total of 20 matches. In this example, awards are provided based on the number of matches that each player obtained out of the total number of matches. Player A obtained 30% of the matches (i.e., 6 matches out of the 20 combined matches), and, therefore, Player A wins 30% of the total bonus payout of 100, or $30. Player F, on the other hand, only obtained 5% of the total number of matches (i.e., 1 match out of the 20 combined matches). Thus, Player F wins 5% of the total bonus payout of $100, or $5. Accordingly, in such an embodiment, players with more matches are paid a higher amount or a higher portion of the fixed bonus payout.

In other embodiments, the total bonus payout is based on a paytable for the number of matches. The total bonus payout may vary from game to game depending on the paytable employed in the bonus game. For example, a bonus game paytable may dictate that obtaining 5 matches results in an award of $20, and obtaining 3 matches results in an award of $10. In such embodiments, there is a maximum award that players can win in the bonus game based on the paytable.

In another embodiment, the total bonus payout is a progressive amount which grows until the bonus game is played and then dispensed as the awards are above. In one embodiment, the bonus payout is a progressive award which is provided based on obtaining a number of matches that is statistically very difficult. In one embodiment, progressive awards are provided based on players achieving designated ratios of the number of matches obtained by a player to the total number of positions that that player had on the bonus game board. For example, a player obtains 10 matches and had a total of 11 positions on the bonus game board. This corresponds to a designated ratio which triggers a progressive win (i.e., a ratio of 10:11). Accordingly, the player wins a progressive award or a portion of the progressive award for achieving this ratio. It should be appreciated that, in such embodiments, a plurality of designated ratios may cause progressive awards to be provided. For example, progressive awards may be provided for the following ratios of the number of matches obtained by a player to the total number of positions that that player had on the bonus game board: 8:8, 9:9, 10:11, 10:12, 11:13, 11:14, 12:15, 12:16, 13:17, 13:18, 13:19, and 14:20.

In another embodiment, the bonus awards provided to the players in the multiplayer bonus game are based on a combination of each player's wager amount and that player's number of matches. An example of one such embodiment is illustrated by the table of FIG. 5B. In this example, the total bonus payout for the multiplayer bonus game is $100, and there are a total of 20 matches. In this example, bonus awards are provided based on the number of matches that a player obtains and that player's wager amount. More specifically, the number of matches that a player obtains is multiplied by that player's wager amount to determine the size of their share of the total bonus payout. This number is then divided by the sum of all players matches multiplied by their wager amount to determine the portion of the total payout. As indicated in FIG. 5B, Player A obtained 6 matches, which is more than any of the other players. However, Player A only wagered 25 cents. Player A's number of matches multiplied by Player A's wager amount is 1.5. This number is 5.7% of 26.25, which is the sum of every player's number of matches multiplied by that player's wager amount. Based on the results described in FIG. 5B, Player A wins 5.7% of the total bonus payout of $100, which is $5.71. In such an embodiment, players who wager more have the opportunity to win larger awards in the bonus game. Nevertheless, players who wish to play with lower wager amounts can still participate in the multiplayer bonus game.

In another embodiment, each player who participates in the multiplayer bonus game receives an award, regardless of whether or not that player obtained a match in the bonus game. In one such embodiment, each player is provided with a minimum or default win amount. Any amounts won for matching positions are provided to the player in addition to the default win amount. In one embodiment, if the players who participated in the multiplayer bonus game do not win the full bonus amount, any remaining bonus amount is added to what can be won the next time the multiplayer bonus game is triggered.

In one embodiment, upon the triggering of the multiplayer bonus game, only players playing at gaming devices which are in active status are enabled to participate in the multiplayer bonus game. In one embodiment, the central controller determines the status of the gaming devices in the gaming system and provides zero, one or more players playing at gaming devices which are in active status a chance to participate in the multiplayer bonus game. In this embodiment such determination is based, at least in part, on the status of each of the gaming devices in the gaming system. In one embodiment, the status of one or more gaming devices in the gaming system as either enrolled or inactive status or active status determines whether the player playing at those gaming devices are eligible to participate in the multiplayer bonus game. The central controller determines that a gaming device is in active status, and thus provides the player playing at that gaming device a chance to participate in the multiplayer bonus game, based on one or more criteria as described below.

The enrolled or inactive status means that the gaming device is one of the linked gaming devices in the group, but is not being actively played by a player during a multiplayer bonus game qualification period (i.e., when the central controller is determining whether to cause the triggering of the multiplayer bonus game). A gaming device may be classified as enrolled status for several reasons. For example, no player may be playing the gaming device. In another example, a player could be playing the gaming device (i.e., by having credits on the gaming device), but be playing too slowly or be interrupted during play. In this case, the player could have credits on the credit meter of the gaming device, but the player has not made a wager on a primary game or otherwise qualified to participate in the multiplayer bonus game.

The active status means that the gaming device is being actively played by a player during a multiplayer bonus game qualification period. In one embodiment, actively playing during a multiplayer bonus game qualification period means that the player is playing the primary game of the gaming device (i.e., placing wagers on plays of the primary game) at least at a predefined minimum rate during a predefined time period. For example, the gaming device may be in active status when a player has made at least one play of the primary game in a fifteen second period prior to the triggering of the multiplayer bonus game. In this example, the multiplayer bonus game qualification period is that fifteen second period prior to the triggering of the multiplayer bonus game.

In another embodiment, the active status is alternatively or additionally based on the amount wagered on the plays of the primary game during a multiplayer bonus game qualification period. In a further alternative embodiment, the determination of the active status is based on a designated minimum number of plays of the primary game or number of wagers on the primary game in a designated time period. The determination of active status may take into account other factors such as interruptions or displays in play of the primary game such as caused by the triggering of other game events or the operation of other secondary games of the gaming devices. In another embodiment, a gaming device can only be determined to be an active gaming device if an additional wager, such as a side-bet or side-wager, is made by a player at a gaming device of the group for one player of a game, a plurality of plays of a game or all plays of a game in a designed period of time, such as a designed time period. It should be appreciated that a gaming device is classified as active based on any one or more suitable parameters or criteria as determined by the implementer or operator of the gaming system.

In another alternative embodiment, a minimum wager level is required for a player to qualify to participate in the multiplayer bonus game. In one embodiment, this minimum wager level is the maximum wager level for the primary game in the gaming device. This requirement is in addition to the requirement that the player be playing at an active gaming device to participate in the multiplayer bonus game. Another method for determining if the gaming device is active is whether or not the player has wagered a minimum level of monetary units since the occurrence of the last multiplayer bonus game.

It should also be appreciated that one or more additional statuses may be employed. For instance, a gaming device will be in a participating status if an individual player playing the gaming device is a premier player. This could be determined at least in part based on the status of that player determined via a player tracking card or other player identification device used by that player in the gaming device. It should be appreciated that other criteria can be used to determine if a gaming device is in the participating status. It should be further appreciated that when a gaming device is in the participating status, the gaming system automatically treats the gaming device as an active gaming device for purposes of the other determinations including eligibility to participate in the multiplayer bonus game.

Figure 6:
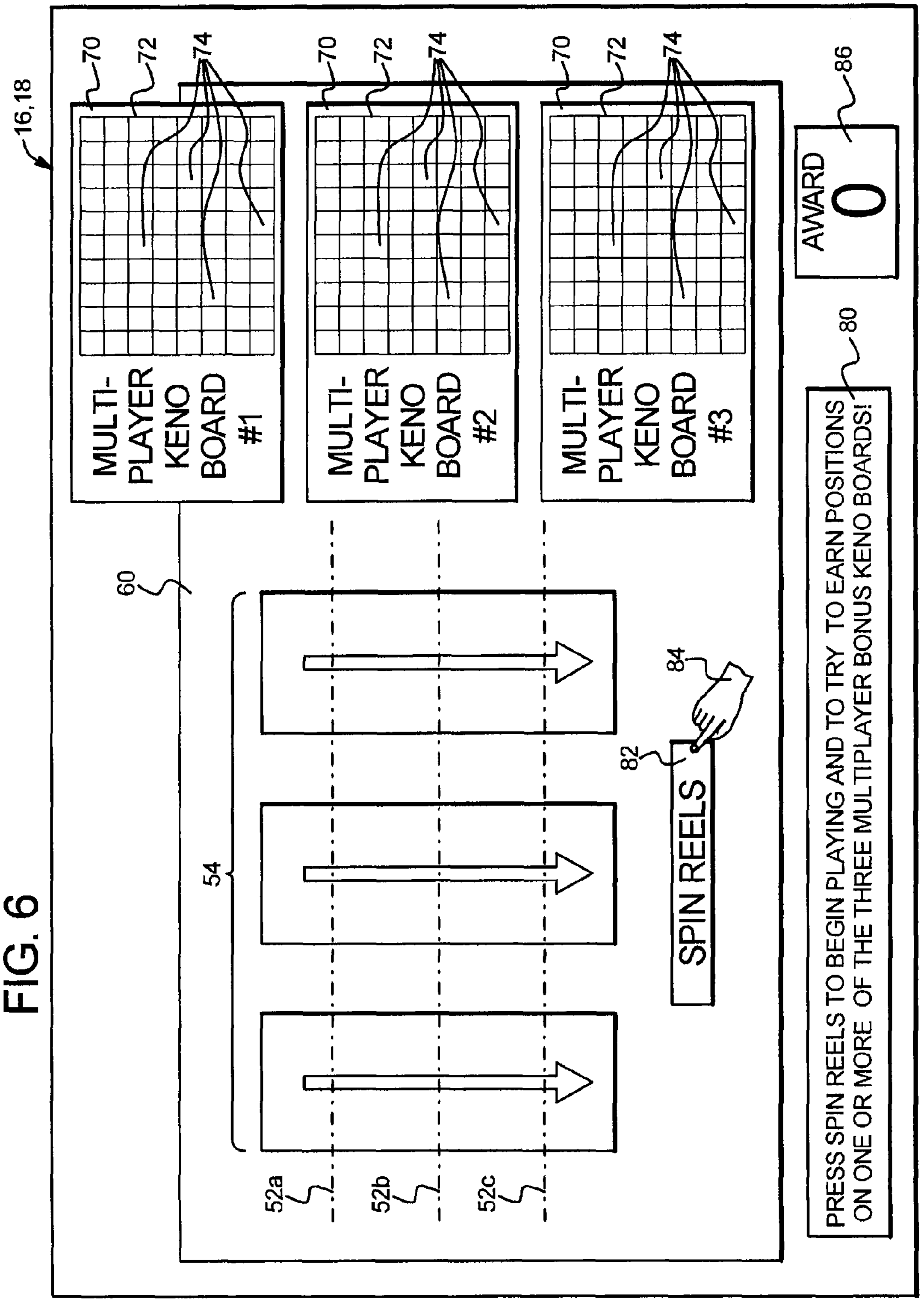
FIG. 6 illustrates a screen shot for one player who is participating in a plurality of multiplayer bonus keno games.

Referring now to FIG. 6, in one embodiment, the gaming system of the present disclosure provides a plurality of multiplayer bonus games which occur simultaneously or in an overlapping manner. In such an embodiment, players playing at the gaming devices in the gaming system have the opportunity to obtain positions on a plurality of multiplayer bonus boards for a plurality of multiplayer bonus games. In the example of FIG. 6, the plurality of multiplayer bonus games are the same type of game (i.e., three multiplayer bonus keno games are provided). In another embodiment, one or more of the plurality of multiplayer bonus games are different types of games. For example, players can obtain positions on a multiplayer bonus keno board, as well as positions on a multiplayer bonus bingo board. In one embodiment, each time a position award triggering event occurs on a player's gaming device, that player can choose which multiplayer bonus board or boards on which the player wishes to obtain one or more positions. In another embodiment, players randomly obtain positions on one of the multiplayer bonus boards. In other embodiments, there are different position award triggering events, and each of the multiplayer bonus game boards corresponds to a designated one or more of the position award triggering events. In such embodiments, when a certain position award triggering event occurs at one of the game devices, the player playing at that gaming device obtains one or more positions on the specific multiplayer bonus board corresponding to the position award triggering event.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a plurality of gaming devices, each of the gaming devices configured to display at least one primary game upon a wager;

at least one display device associated with the gaming devices; and a controller configured to operate with the gaming devices and the at least one display device to:

(a) enable a plurality of players to place wagers at the gaming devices to play the at least one primary game;

(b) display a play of a group bonus game having a group keno board, the group keno board including a predetermined quantity of positions, wherein each of the positions of the predetermined quantity of positions is capable of being associated with only one of the players for said play of the group bonus game;

(c) for each of the gaming devices, for each play of the at least one primary game at said gaming device, for each one of a plurality of position award triggers that occurs in association with said play of the at least one primary game:

(i) determine at least one of the positions of the predetermined quantity of positions that is not associated with any of the players for said play of the group bonus game to associate with the player of said gaming device for said play of the group bonus game, and (ii) associate said determined at least one of the positions with said player for said play of the group bonus game; and (d) for a group bonus game triggering event for said play of the group bonus game:

(i) randomly select and display a designated quantity of the positions of the predetermined quantity of positions to form a controller-selected set of positions, (ii) determine a group bonus game outcome based on a comparison of:

(A) any of the positions of the predetermined quantity of positions that are associated with any of the players, and (B) the positions in the controller-selected set of positions, (iii) determine any awards to be provided to one or more of the players based on the group bonus game outcome, and (iv) cause any determined awards to be provided to said one or more of the players.

2. The gaming system of claim 1, wherein each of the position award triggers is based on at least one of: (i) a randomly determined event, and (ii) a predetermined event.

3. The gaming system of claim 1, wherein the controller is configured operate with the gaming devices and the at least one display device to, for each of the gaming devices, for each play of the at least one primary game at said gaming device, for each one of the position award triggers that occurs in association with said play of the at least one primary game, determine which position or positions of the predetermined quantity of positions to associate with the player of said gaming device for said play of the group bonus game randomly, based on an event associated with the primary game, or based on a predetermined event.

4. The gaming system of claim 1, wherein the controller is configured to operate with the gaming devices and the at least one display device to, for each of the gaming devices, for each play of the at least one primary game at said gaming device, for each one of the position award triggers that occurs in association with said play of the at least one primary game, enable the player of said gaming device to select at least one of the positions of the predetermined quantity of positions to be associated with said player for said play of the group bonus game.

5. The gaming system of claim 1, wherein said group bonus game triggering event occurs when a designated quantity of the positions of the predetermined quantity of positions have been associated with the players.

6. The gaming system of claim 1, wherein the group bonus game is associated with a total bonus award, and wherein, for said play of the group bonus game, if any awards are determined to be provided to one or more of the players, each determined award includes a portion of said total bonus award.

7. The gaming system of claim 6, wherein the each portion of said total bonus award is based at least in part on a wager placed by the player being provided with said portion.

8. The gaming system of claim 1, wherein the comparison includes determining whether any of the positions of the predetermined quantity of positions that are associated with any of the players match the positions in the controller-selected set of positions.

9. The gaming system of claim 8, wherein any determined award provided to one of the players is based on a number of the positions of the predetermined quantity of positions associated with said player that match the positions in the controller-selected set of positions.

10. A gaming system comprising:

a plurality of gaming devices, each of the gaming devices configured to display a primary game upon a wager;

at least one display device associated with the gaming devices; and a controller configured to operate with the gaming devices and the at least one display device to:

(a) enable a plurality of players to place wagers at the gaming devices to play the primary game;

(b) display a play of a group bonus game having a plurality of group keno boards, each of the group keno boards including a predetermined quantity of positions, wherein each of the positions of the predetermined quantities of positions is capable of being associated with only one of the players for said play of the group bonus game;

(c) for each of the gaming devices, for each play of the primary game at said gaming device, for each one of a plurality of position award triggers that occurs in association with said play of the at least one primary game:

(i) determine at least one of the positions of the predetermined quantity of positions of at least one of the group keno boards that is not associated with any of the players for said play of the group bonus game to associate with the player of said gaming device; and (ii) associate said determined at least one of the positions with said player for said play of the group bonus game; and (d) for a group bonus game triggering event for said play of the group bonus game, for at least one of the group keno boards:

(i) randomly select and display a designated quantity of the positions of the predetermined quantity of positions of said group keno board to form a controller-selected set of positions, (ii) determine a group bonus game outcome based on a comparison of:

(A) any of the positions of the predetermined quantity of positions of said group keno board that are associated with any of the players, and (B) the positions that are included in the controller-selected set of positions, (iii) determine any awards to be provided to one or more of the players based on the group bonus game outcome, and (iv) cause any determined awards to be provided to said players.

11. The gaming system of claim 10, wherein the controller is configured to operate with the gaming devices and the at least one display device to, for each of the gaming devices, for each play of the primary game, for each one of the position award triggers that occurs in association with said play of the at least one primary game, enable the player of said gaming device to select at least one of the group keno boards, determine at least one of the positions of the predetermined quantity of positions of the selected at least one group keno board to associate with said player for said play of the group bonus game, and associate said determined at least one of the positions of the selected at least one group keno board with said player for said play of the group bonus game.

12. The gaming system of claim 10, wherein the controller is configured to operate with the gaming devices and the at least one display device to, for each of the gaming devices, for each play of the primary game, for each one of the position award triggers that occurs in association with said play of the at least one primary game, randomly determine at least one of the positions of the predetermined quantity of positions of the selected at least one group keno board to associate with said player for said play of the group bonus game, and associate said randomly determined at least one of the positions of the selected at least one group keno board with said player for said play of the group bonus game.

13. The gaming system of claim 10, wherein each of the group keno boards is associated with a different one of the position award triggers, and the controller is configured to operate with the gaming devices and the at least one display device to, for each of the gaming devices, for each play of the primary game, for each one of the position award triggers that occurs in association with said play of the at least one primary game, determine one of the group keno boards based on said position award trigger, determine at least one of the positions of the predetermined quantity of positions of the determined group keno board to associate with said player for said play of the group bonus game, and associate said determined at least one of the positions of the determined group keno board with said player for said play of the group bonus game.

* * * * *

UNITED STATES PATENT AND TRADEMARK OFFICE

CERTIFICATE OF CORRECTION

PATENT NO. : 8,070,587 B2
APPLICATION NO. : 11/925296
DATED : December 6, 2011
INVENTOR(S) : Dwayne A. Davis et al.

It is certified that error appears in the above-identified patent and that said Letters Patent is hereby corrected as shown below:

IN THE CLAIMS:

In Claim 3, column 29, line 62, before “primary game” add --at least one--.

In Claim 7, column 30, line 18, after “wherein” delete “the”.

In Claim 11, column 31, line 18, before “primary game” delete “at least one”.

In Claim 12, column 31, line 26, replace “10” with --11--.

In Claim 12, column 32, line 4, before “primary game” delete “at least one”.

In Claim 13, column 32, line 17, before “primary” delete “at least one”.

Signed and Sealed this
Twenty-ninth Day of May, 2012

David J. Kappos
*Director of the United States Patent and Trademark Office*